（12) United States Patent
Moravek et al.

(10) Patent No.: US 10,540,899 B2
(45) Date of Patent: Jan. 21, 2020

(54) FLIGHT PLAN SEGMENTATION FOR EN ROUTE DIVERSION DESTINATIONS

(71) Applicant: HONEYWELL INTERNATIONAL INC., Morris Plains, NJ (US)

(72) Inventors: Zdenek Moravek, Rozdrojovice (CZ); David Kunes, Tisnov (CZ); Katerina Chmelarova, Hradec Kralove (CZ)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 370 days.

(21) Appl. No.: 15/357,086

(22) Filed: Nov. 21, 2016

(65) Prior Publication Data

US 2018/0144643 A1 May 24, 2018

(51) Int. Cl.
*G08G 5/00* (2006.01)
*B64D 43/00* (2006.01)
*H04L 29/08* (2006.01)

(52) U.S. Cl.
CPC .......... *G08G 5/0039* (2013.01); *B64D 43/00* (2013.01); *G08G 5/0021* (2013.01);
(Continued)

(58) Field of Classification Search
CPC .. G08G 5/0039; G08G 5/0056; G08G 5/0021; G08G 5/0047; G08G 5/0091; B64D 43/00; H04L 67/12
See application file for complete search history.

(56) References Cited

U.S. PATENT DOCUMENTS 5,398,186 A  3/1995  Nakhla
5,842,142 A  11/1998  Murray et al.
(Continued)

FOREIGN PATENT DOCUMENTS

EP  2574965 A2  4/2013
EP  2790168 A2  10/2014
(Continued)

OTHER PUBLICATIONS

ForeFlight Mobile Product Page Nov. 19, 2015; Reference Notes Last accessed at http://foreflight.com/products/foreflight-mobile.
(Continued)

*Primary Examiner* — Christian Chace
*Assistant Examiner* — Jordan S Fei
(74) *Attorney, Agent, or Firm* — Lorenz & Kopf, LLP

(57) ABSTRACT

Methods and systems are provided for segmenting a planned route of travel for indicating suggested or recommended diversion destinations with respect to those segments. One exemplary method of presenting diversion airports involves identifying a segmentation criterion for a flight plan, determining one or more diversion suitability distributions along a flight path defined by the flight plan, transforming the one or more diversion suitability distributions from a true distance scale to an effective distance scale based at least in part on meteorological conditions, and identifying a location for a segment boundary along the flight path based on an extrema of the one or more diversion suitability distributions within a portion of the flight path defined by the segmentation criterion on the effective distance scale. The method continues by providing graphical indicia of the flight path segment defined by the segment boundary and a diversion airport associated therewith.

20 Claims, 15 Drawing Sheets

(52) U.S. Cl.
CPC ......... *G08G 5/0047* (2013.01); *G08G 5/0056* (2013.01); *G08G 5/0091* (2013.01); *H04L 67/12* (2013.01)

(56) References Cited

U.S. PATENT DOCUMENTS

| | | | |
|---|---|---|---|
| 6,199,008 | B1 | 3/2001 | Aratow et al. |
| 6,542,796 | B1 | 4/2003 | Gibbs et al. |
| 7,499,771 | B2 | 3/2009 | Caillaud |
| 7,796,055 | B2 | 9/2010 | Clark et al. |
| 7,908,078 | B2 | 3/2011 | He |
| 7,963,618 | B2 | 6/2011 | Stone et al. |
| 8,010,242 | B1 | 8/2011 | Ginsberg et al. |
| 8,026,831 | B2 | 9/2011 | Muramatsu et al. |
| 8,112,186 | B2 | 2/2012 | Sylvester |
| 8,214,136 | B2 | 7/2012 | Caillaud |
| 8,292,234 | B2 | 10/2012 | Shuster |
| 8,521,343 | B2 | 8/2013 | Spinelli |
| 8,554,457 | B2 | 10/2013 | White et al. |
| 8,565,944 | B1 | 10/2013 | Gershzohn |
| 8,612,070 | B2 | 12/2013 | Geoffroy et al. |
| 8,676,481 | B2 | 3/2014 | Coulmeau et al. |
| 8,849,478 | B2 | 9/2014 | Coulmeau et al. |
| 9,047,769 | B2 | 6/2015 | Lafon et al. |
| 9,064,407 | B2 | 6/2015 | Otto et al. |
| 9,098,996 | B2 | 8/2015 | Barraci et al. |
| 9,310,222 | B1 | 4/2016 | Suiter et al. |
| 2007/0050098 | A1 | 3/2007 | Caillaud |
| 2008/0300737 | A1 | 12/2008 | Sacle et al. |
| 2009/0150012 | A1 | 6/2009 | Agam et al. |
| 2009/0171560 | A1 | 7/2009 | McFerran et al. |
| 2011/0264312 | A1 | 10/2011 | Spinelli et al. |
| 2012/0218127 | A1 | 8/2012 | Kroen |
| 2013/0001355 | A1 | 1/2013 | Cox et al. |
| 2013/0046422 | A1 | 2/2013 | Cabos |
| 2013/0090842 | A1 | 4/2013 | Stabile |
| 2013/0179011 | A1 | 7/2013 | Colby et al. |
| 2014/0309821 | A1 | 10/2014 | Poux et al. |
| 2014/0343765 | A1* | 11/2014 | Suiter ................. G08G 5/0056 701/18 |
| 2015/0081197 | A1 | 3/2015 | Gaertner et al. |
| 2015/0241295 | A1 | 8/2015 | Fuscone et al. |
| 2015/0279218 | A1 | 10/2015 | Irrgang et al. |
| 2015/0371544 | A1 | 12/2015 | Mere |

FOREIGN PATENT DOCUMENTS

| | | |
|---|---|---|
| EP | 3056864 A1 | 8/2016 |
| WO | 2007006310 A2 | 1/2007 |
| WO | 2013162524 A1 | 10/2013 |

OTHER PUBLICATIONS

AVPlan EFB Plan Faster, Fly Sooner Nov. 19, 2015; Reference Notes Last accessed at http://www.avplan-efb.com/avplan.

AivlaSoft Electronic Flight Bag—Cockpit efficiency and situational awareness Nov. 19, 2015; Reference Notes Last accessed at http://www.aivlasoft.com/index.html.

Iopscience Landing on empty: estimating the benefits from reducing fuel uplift in US Civil Aviation, iopscience Dec. 31, 2015; Reference Notes http://iopscience.iop.org/article/10.1088/1748-9326/10/9/094002/pdf.

Stackexchange aviation http://aviation.stackexchange.com/ Dec. 31, 2014; Reference Notes http://aviation.stackexchange.com/questions/2854/when-are-aircraft-required-to-dump-fuel-for-emergency-landings.

What to Consider Overweight Landing? aero quarterly Dec. 31, 2007; Reference Notes http://www.boeing.com/commercial/aeromagazine/articles/qtr_3_07/AERO_Q307_article3.pdf.

FlightGear Forum; Using a Canvas Map in the GUI; 2012.

Automated Ceiling Reports ForeFlight; 2015.

Pad Pilot News; 10 tips to increase your runway awareness with ForeFlight; 2015.

Extended EP Search Report for Application No. 17201261.9 dated Apr. 30, 2018.

Haroon, K; FMC Alternate Airport and Diversion; The Airline Pilots Forum & Resource, 2012.

Atkins, E.M. et al.; Emergency Flight Planning Applied to Total Loss of Thrust; Journal of Aircraft vol. 43, No. 4, Jul.-Aug. 2006.

Moravek, Z. et al.; Methods and Systems Facilitating Holding for an Unavailable Destination; Filed on Feb. 9, 2016 and assigned U.S. Appl. No. 15/019,675.

Moravek, Z. et al.; Methods and Systems for Safe Landing at a Diversion Airport; Filed on Feb. 9, 2016 and assigned U.S. Appl. No. 15/019,650.

Moravek, Z. et al.; Methods and Systems for Presenting Diversion Destinations; Filed on Nov. 30, 2015 and assigned U.S. Appl. No. 14/953,635.

Moravek, Z. et al.; Methods and Systems Facilitating Stabilized Descent to a Diversion Airport; Filed on Feb. 18, 2016 and assigned U.S. Appl. No. 15/047,355.

Moravek, Z. et al.; Methods and Systems for Conveying Destination Viability; Filed on May 3, 2016 and assigned U.S. Appl. No. 15/145,346.

Chmelarova et al.; Methods and Systems for Presenting En Route Diversion Destinations; Filed on Sep. 7, 2016 and assigned U.S. Appl. No. 15/258,400.

* cited by examiner

FLIGHT PLAN SEGMENTATION FOR EN ROUTE DIVERSION DESTINATIONS

CROSS-REFERENCE TO RELATED APPLICATIONS

The subject matter described here is related to the subject matter described in U.S. patent application Ser. No. 15/258,400, filed Sep. 7, 2016.

TECHNICAL FIELD

The subject matter described herein relates generally to vehicle display systems and related human factors, and more particularly, embodiments of the subject matter relate to aircraft systems capable of reducing a pilot's workload when selecting en route diversion or alternate airports.

BACKGROUND

Pilots, air traffic controllers, airline personnel and the like routinely monitor meteorological data, reports, and forecasts to assess any potential impacts on the current or anticipated flight plan and the intended destination. However, in situations where the aircraft needs to deviate from the original plan, such as an emergency situation, the information needs to be reanalyzed with respect to the deviation to facilitate continued safe operation. For example, in the case of an emergency landing, ideally a pilot would select an airport within range of the aircraft where landing is least likely to be compromised or complicated by weather or other factors. This requires consideration of numerous pieces of information (e.g., fuel remaining and distance to be traveled, weather radar and/or forecast information, NOTAMs, SIGMETs, PIREPs, and the like), which often is distributed across different displays or instruments, requiring the pilot to mentally piece together all the different information from the different sources. Additionally, in the case where the information for the first airport analyzed discourages landing there, the pilot must repeat the task of aggregating and analyzing the information for one or more additional airports.

In some situations, during pre-flight briefing, a pilot may desire to preselect alternate or diversion airports along the flight plan for potential use en route to the destination. While the foregoing demands of mentally piecing together different information from different sources persist, the pilot must also analyze the information with respect to locations along the flight plan. Additionally, the pilot may be tasked with subdividing the flight plan into segments for which diversion airports need to be defined, which further adds to the pilot's workload. While some existing approaches segment the flight plan in an automated manner, they often fail to account for individual preferences, real-time airport availabilities, and other complex factors, and thus, may result in a suboptimal segmentation of the flight plan that fails to satisfy criteria that are specified or otherwise desired by the pilot or aircraft operator. Accordingly, it is desirable to reduce the mental workload of the pilot segmenting a flight plan and analyzing and selecting alternates en route to a destination.

BRIEF SUMMARY

Methods and systems are provided for presenting potential diversion destinations for a vehicle, such as an aircraft. One exemplary method of presenting potential diversion airports for an aircraft involves identifying a segmentation criterion for a flight plan, determining one or more diversion suitability distributions along a flight path defined by the flight plan, transforming the one or more diversion suitability distributions from a true distance scale to an effective distance scale based at least in part on meteorological conditions, identifying a location for a segment boundary along the flight path based on an extrema of the one or more diversion suitability distributions within a portion of the flight path defined by the segmentation criterion on the effective distance scale, providing a graphical indication of a flight path segment defined by the segment boundary, and providing a graphical indication of a diversion airport associated with the flight path segment defined by the segment boundary.

In another embodiment, a system is provided that includes a display device onboard a vehicle, a user input device onboard the vehicle to obtain a segmentation criterion for a travel plan, a data storage element maintaining diversion preference information, and a processing system coupled to the user input device, the data storage element, and the display device. The processing system determines one or more diversion suitability distributions along a path defined by the travel plan based at least in part on the diversion preference information, identifies a location for a segment boundary along the travel plan based on an extrema of the one or more diversion suitability distributions within a portion of the travel plan defined by the segmentation criterion, provides a graphical indication of a segment defined by the segment boundary on the display device, and provides a graphical indication of a diversion destination associated with the segment defined by the segment boundary on the display device.

In yet another embodiment, a method of presenting potential diversion airports for an aircraft involves identifying, by a processing system onboard the aircraft, a segmentation criterion for a flight plan, obtaining, by the processing system, diversion preference information, determining, by the processing system, one or more diversion suitability distributions within a geographic area encompassing a flight path defined by the flight plan based at least in part on the diversion preference information, obtaining, by the processing system, meteorological conditions pertaining to the flight plan, transforming, by the processing system, the one or more diversion suitability distributions from a true distance scale to an effective distance scale based at least in part on the meteorological conditions, resulting in one or more scaled diversion suitability distributions, identifying, by the processing system, a location for a segment boundary along the flight path based on an extrema of the one or more scaled diversion suitability distributions within a portion of the flight path defined by the segmentation criterion on the effective distance scale, providing, by the processing system on a display device onboard the aircraft, a graphical indication of a flight path segment defined by the segment boundary, identifying, by the processing system, a recommended diversion airport with respect to the flight path segment, and providing, by the processing system on the display device, a graphical indication of the recommended diversion airport associated with the flight path segment.

BRIEF DESCRIPTION OF THE DRAWINGS

Embodiments of the subject matter will hereinafter be described in conjunction with the following drawing figures, wherein like numerals denote like elements, and:

FIG. 1 is a block diagram of a system for an aircraft in an exemplary embodiment;

Figure 1:
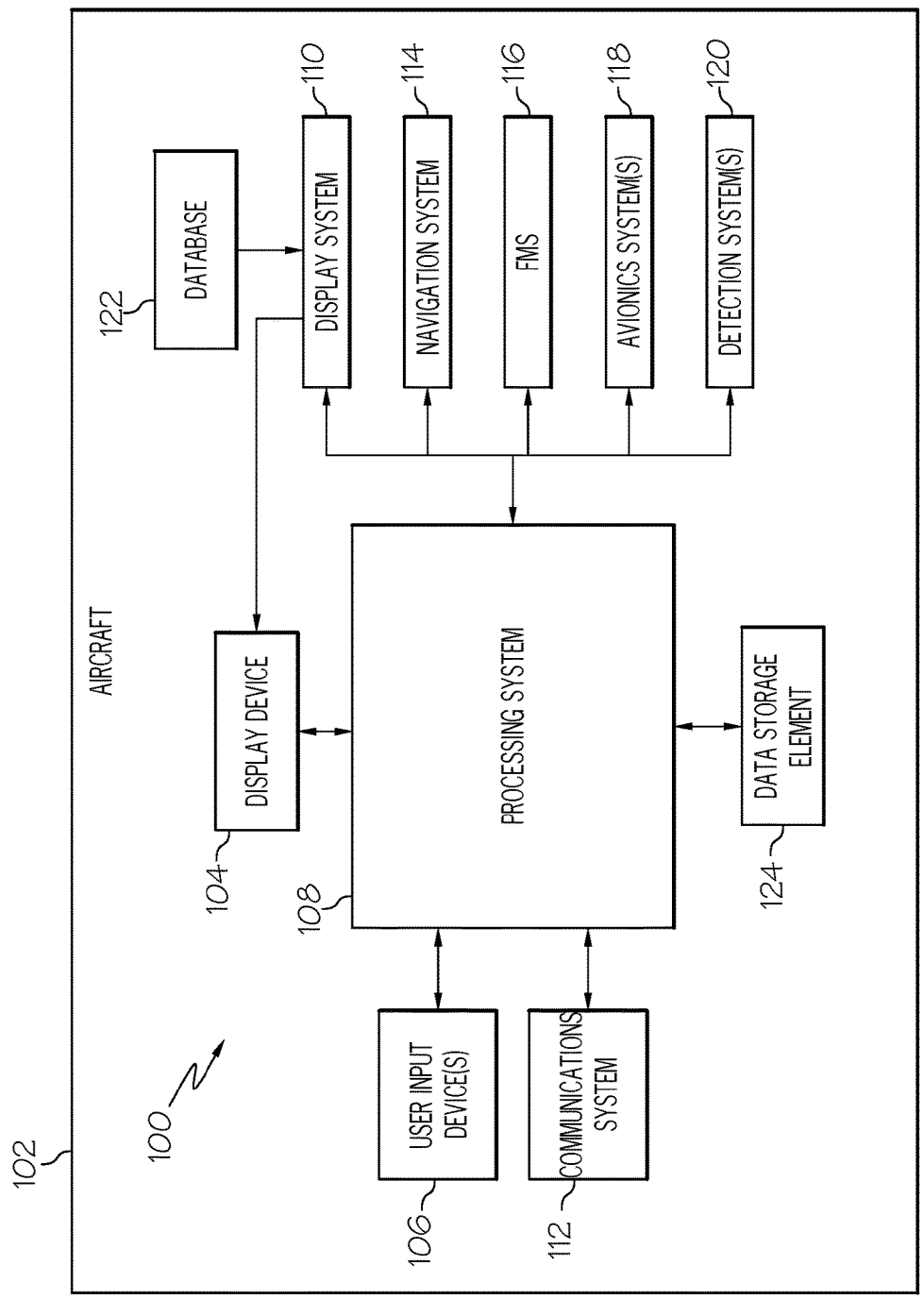
Figure 2:
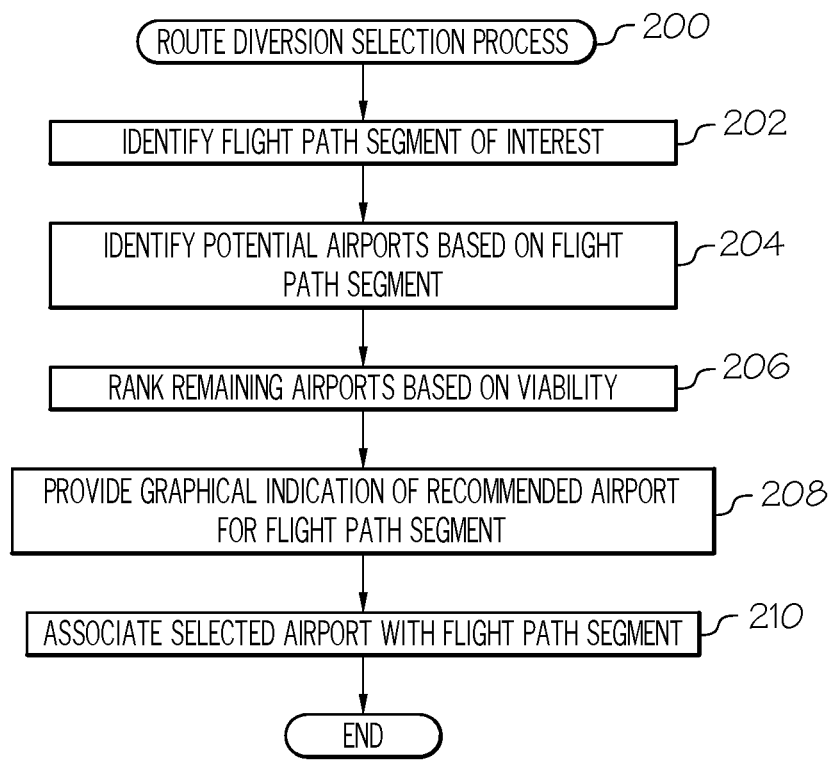
FIG. 2 is a flow diagram of an exemplary route diversion selection process suitable for use with the aircraft in the system of FIG. 1 in accordance with one or more embodiments.
Figure 9:
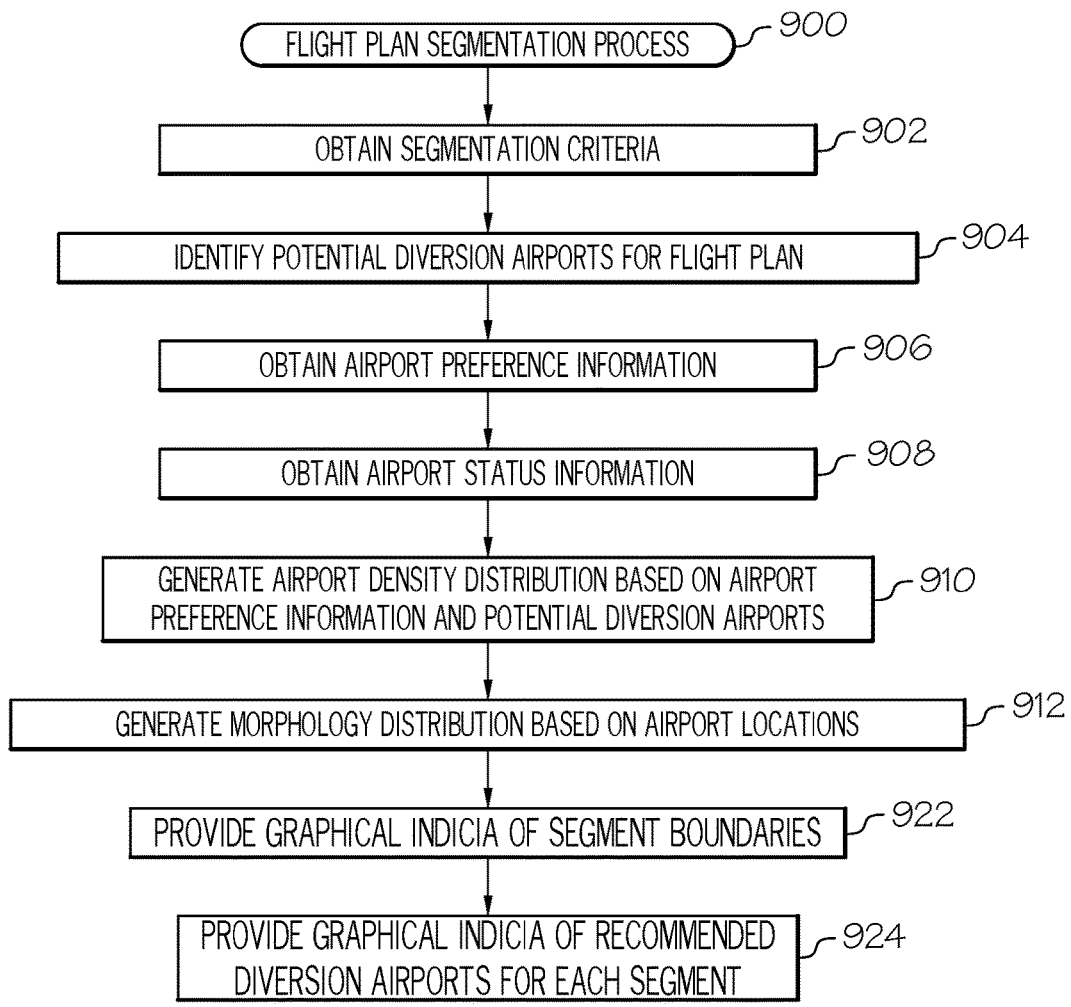
FIG. 9 is a flow diagram of an exemplary flight plan segmentation process suitable for use with the aircraft in the system of FIG. 1 in conjunction with the route diversion selection process of FIG. 2 in accordance with one or more embodiments.
Figure 14:
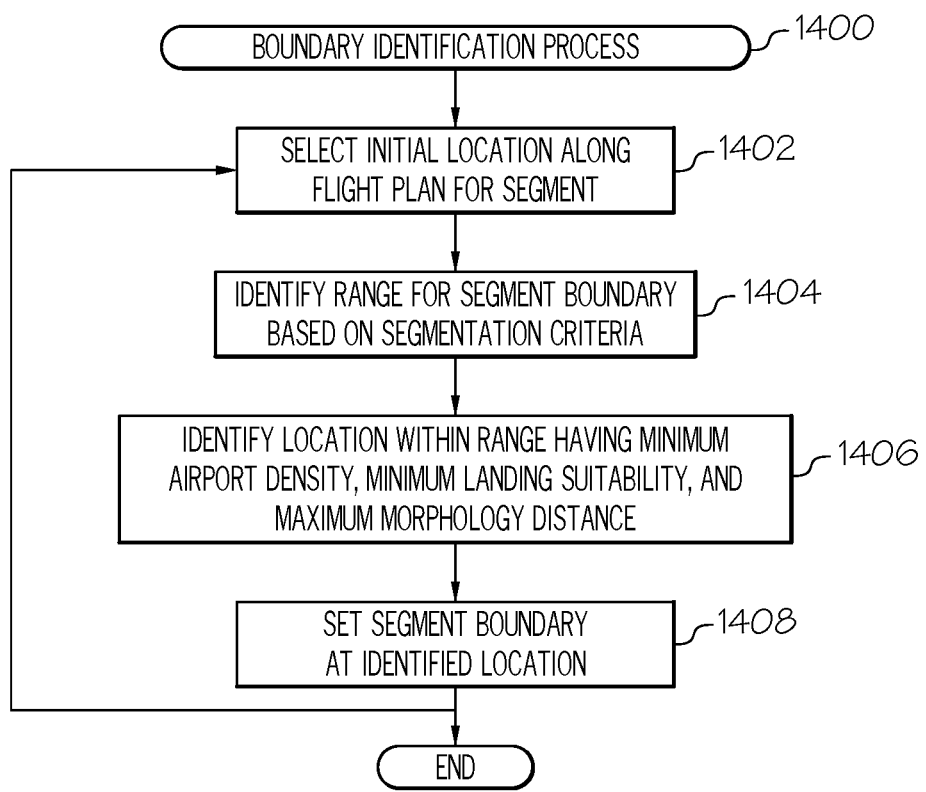
FIG. 14 is a flow diagram of an exemplary segment boundary identification process suitable for implementation in conjunction with the flight plan segmentation process of FIG. 9 in accordance with one or more exemplary embodiments.
Figure 16:
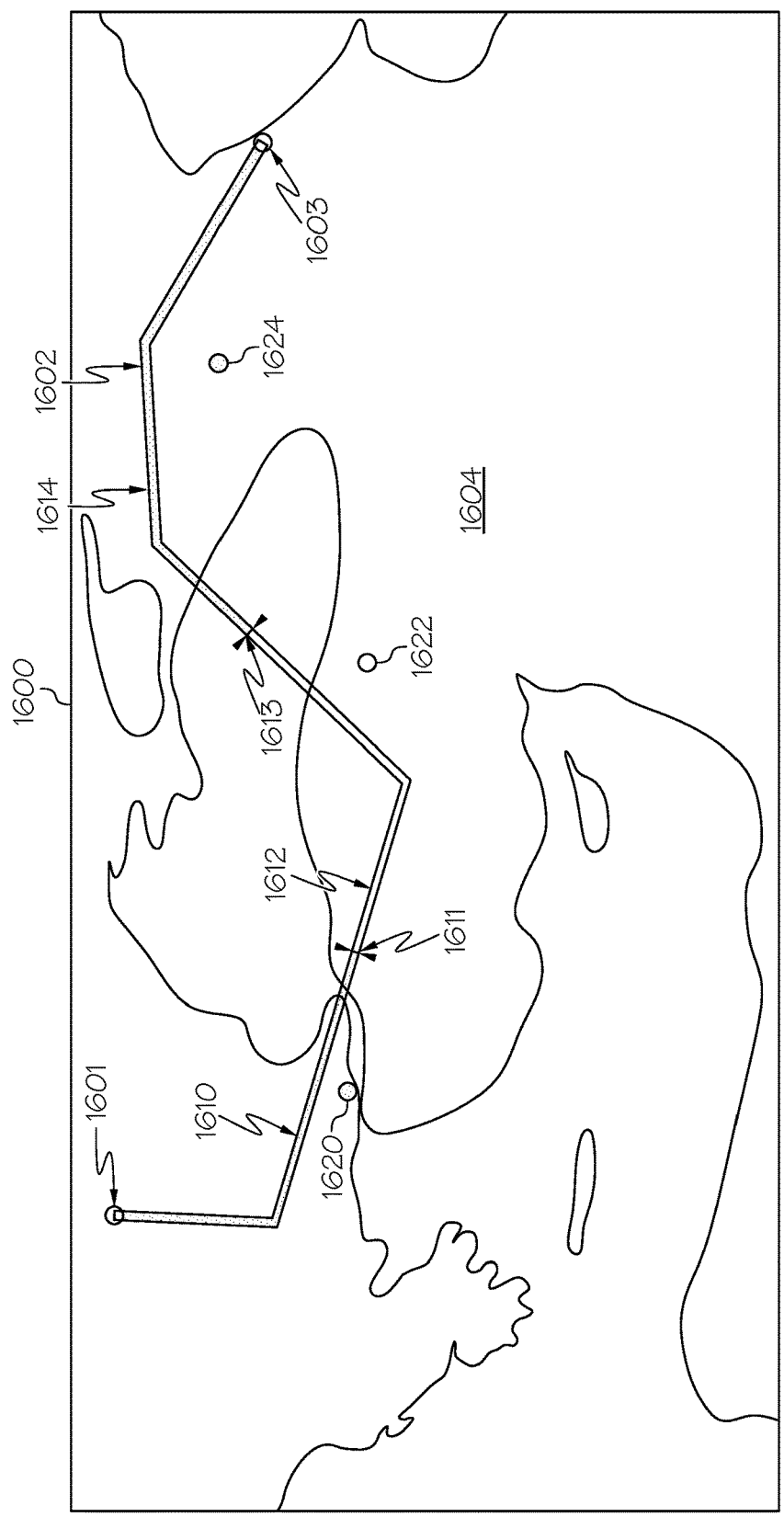
Figure 17:
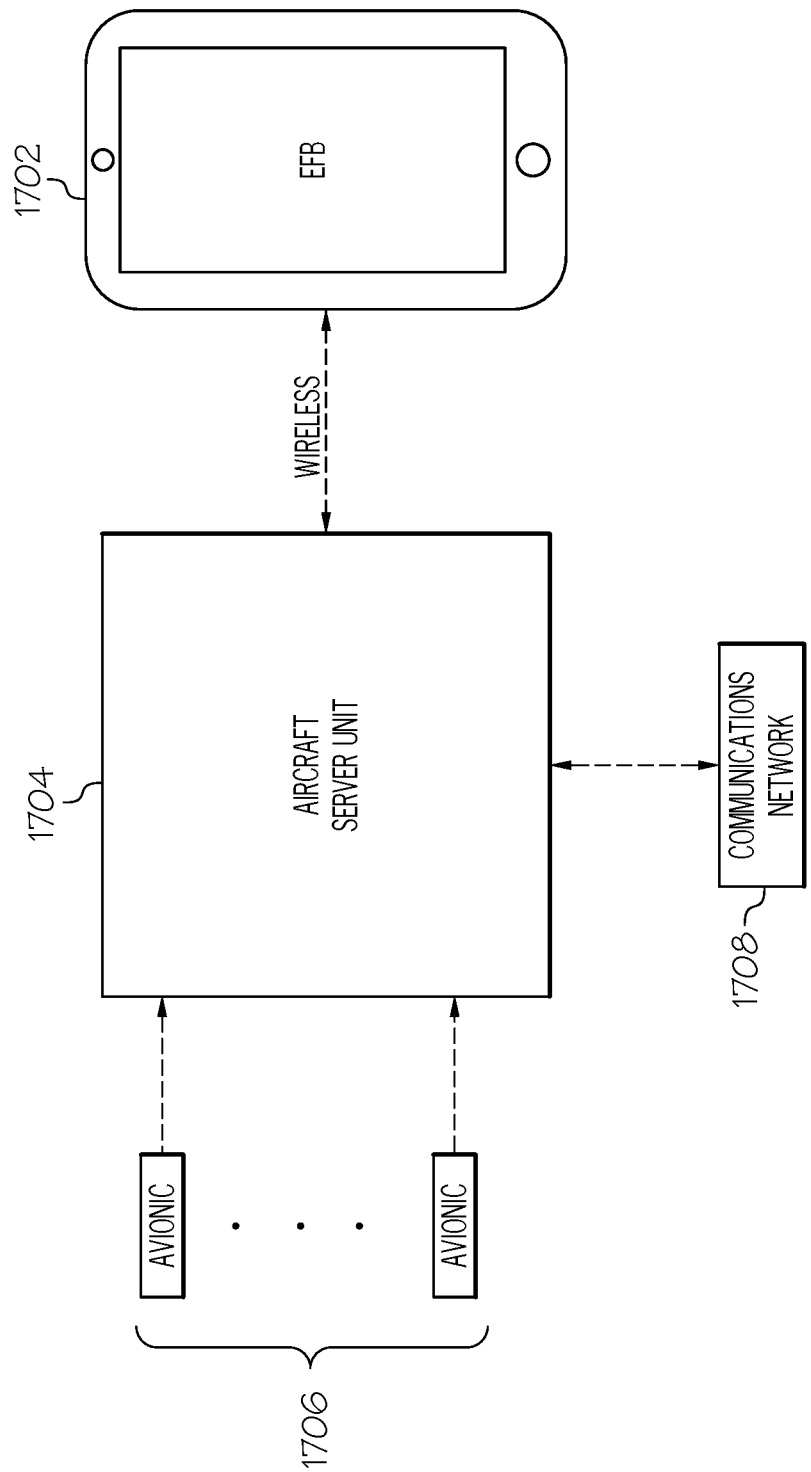

FIG. 16 depicts an exemplary navigational map display suitable for display on a display device associated with the aircraft in the system of FIG. 1 in accordance with one or more embodiments of the flight plan segmentation process of FIG. 9; and FIG. 17 depicts an exemplary embodiment of an electronic flight bag (EFB) system suitable for implementing the route diversion selection process of FIG. 2 and the flight plan segmentation processes of FIGS. 9 and 14 in conjunction with the aircraft system of FIG. 1 in accordance with one or more embodiments.

DETAILED DESCRIPTION

Embodiments of the subject matter described herein generally relate to systems and methods for automatically subdividing a planned route of travel into a number of segments and intelligently presenting potential diversion destinations with respect to those segments to a vehicle operator in a manner that reduces workload while improving situational awareness with respect to an otherwise complex situation. For example, a pilot looking to divert from a location along an originally scheduled flight plan and land the aircraft may be faced with numerous potential landing locations (e.g., airports, landing strips, and the like), with each being associated with its own unique set of factors or current circumstances that may make that location more or less suitable for landing the aircraft, while also having to account for the current operations of the aircraft (and any operational concerns associated therewith). While the subject matter is primarily described herein in the context of presenting potential diversion airports for an aircraft looking to deviate from a flight plan, the subject matter described herein may be similarly utilized in other applications to deviate from a predefined route for travel (e.g., a travel plan or travel route) or with another vehicle (e.g., automobiles, marine vessels, trains). That said, for purposes of explanation, but without limitation, the subject matter is described herein in the context of presenting information pertaining to aircraft operations. Additionally, it should be noted the subject matter is not necessarily limited to vehicle operators and may be utilized by dispatchers, air traffic controllers, or other users, as appropriate.

As described in greater detail below, and in particular in the context of FIGS. 9-16, in exemplary embodiments described herein, the flight plan is subdivided or segmented into a number of segments between departure and destination locations, with diversion destinations being analyzed and presented with respect to each segment. Stated another way, each flight plan has a plurality of segments for which alternate or diversion destinations may be defined. Based on various criteria, as to be discussed below, a processing system automatically determines a manner in which to divide a flight plan into segments, and then determines a limited subset of airports capable of being an acceptable diversion destination associated with each particular flight plan segment. Airports among this subset are then analyzed in terms of their viability with respect to that segment and the most viable airport may be indicated as recommended or preferable and presented on a display associated with the aircraft. In this manner, the subject matter described herein reduces pilot workload in identifying how to segment a flight plan, while also reducing pilot workload in identifying a desired alternate destination for a particular flight plan segment once identified.

In exemplary embodiments, the flight plan is automatically divided according to one or more segmentation criteria based upon distributions for diversion suitability characteristics in a geographic area along a flight path defined by a flight plan. In this regard, the location for a flight path segment boundary is identified or otherwise determined from within a portion of the flight plan defined by the segmentation criteria based on an extrema of density distributions, which corresponds to the location within that portion of the flight plan having the lowest diversion suitability in terms of the distribution of potential diversion airports reachable from that location and other diversion preference information, such as topographic, geographic, or other landing zone preferences. The landing zone preference information may be defined by the pilot, aircraft operator, airline, or the like, and may be utilized to apply various weightings to airports, the surrounding topography, and potentially other factors that impact the perceived suitability of diverting from a particular location along the flight plan. In exemplary embodiments, the density distributions are also scaled from a true distance scale reflecting the actual geographic distance on the ground to an effective distance scale based on current or forecasted meteorological conditions prior to identifying the segment boundaries to facilitate maintaining distances between potential diversion airports and segment boundaries that are within prescribed segmentation criteria defined in terms of flight times or other constraints.

After flight path segments are determined, for each particular flight path segment, potential diversion destinations are scored, graded, or otherwise quantified in terms of their respective viabilities with respect to the entire length or duration of the flight path segment to be flown by the aircraft. Accordingly, the potential diversion destinations to be analyzed with respect to a particular flight path segment may be initially filtered based on their distance from one or more locations along the segment (e.g., in terms geographic distance, flight time, or the like) or other filtering criteria to limit the scope of the analysis to a limited number of realistic or feasible potential destinations.

After filtering the potential diversion destinations to be analyzed with respect to a flight path segment, the remaining potential diversion destinations within the filtered subset are scored, graded, or otherwise quantified in terms of their respective viabilities with respect to the length of the segment of interest. For example, anticipated or planned status information (e.g., planned aircraft flight phase, altitude, velocity, or other status or state information, forecasted meteorological conditions, or the like) associated with different locations along the flight path segment being analyzed may be obtained and utilized to analyze the relative viability of each potential diversion destination with respect to those different locations. In this regard, a viability score for a potential diversion destination for each location along the flight path segment for which status information is obtained, and then the resulting viability scores may be averaged to obtain a representative viability score for that diversion destination with respect to the segment. In exemplary embodiments, anticipated status information associated with each of a plurality of alternate destinations and anticipated or forecasted meteorological conditions are also obtained and utilized when determining the viability scores. Accordingly, prior to departure, the potential diversion destinations are scored, graded, or otherwise quantified with respect to a flight path segment in a manner that accounts for the anticipated aircraft operational status along the flight path segment as well as the current or anticipated operational status of each respective destination, current or anticipated status of the route between locations along the flight path segment and the respective destination, and the like. Thus, anticipated operational changes at a given airport, forecasted meteorological conditions, or the like for the anticipated timeframe during which the aircraft will traverse that the flight path segment may be accounted for while also taking into account current conditions.

In one or more embodiments, a graphical user interface (GUI) display is provided that presents or otherwise provides indicia of a recommended diversion destination or the relative viabilities of potential diversion destinations with respect to the flight path segment and enables a pilot or other user to select or otherwise identify which destination he or she would like to associated with that segment of the flight plan prior to departure or otherwise in advance of reaching that segment. In this regard, the GUI display may enable the pilot to sequentially step through the individual segments of the flight plan to define desired diversion destinations along the entire route of the flight plan.

As described in greater detail below in the context of FIGS. 4-6, in one or more embodiments, after departure, the viability scoring and ranking of the potential diversion destinations may be dynamically updated to reflect changing conditions and provide corresponding indications to the pilot. For example, when the aircraft is traveling along a particular flight path segment and the current conditions indicate a particular diversion destination currently has a higher viability with respect to the remainder of the flight path segment yet to be flown than a preselected diversion destination for that flight path segment, one or more graphical indicia or other visual cues may be provided to indicate to the pilot that another diversion destination may be preferable in the event of a need to divert from the flight plan. Thus, when a preselected diversion destination becomes suboptimal or less viable than another potential alternative, the pilot may be apprised of such changes in real-time while en route, thereby improving the pilot's situational awareness in the event a diversion is necessary. Depending on the embodiment, the preselected diversion destination may be automatically selected (e.g., by a flight management system or similar onboard system) or manually selected, and could be previously selected prior to flying the flight plan, after initiating aircraft operation along the flight plan but prior to flying the current flight path segment, or in some embodiments, potentially after initiating aircraft operation along the current flight path segment but prior to the aircraft reaching its current location.

In one or more embodiments, potential diversion destinations are scored, graded, or otherwise quantified in terms of their respective viabilities with respect to a flight path segment in real-time based at least in part on the current vehicle status as well as the current status of each respective destination, which may also include or otherwise account for the current status of the route to/from the respective destination. Thus, when either the current status of the vehicle (e.g., fuel remaining, aircraft weight, etc.) or the current status of a particular destination or the route thereto (e.g., adverse weather conditions, closed or limited runways, etc.) has potential to complicate use of that destination, the viability of that particular destination may be characterized as having a lower viability than it may otherwise have been absent such complicating factors. In exemplary embodiments, for each potential destination, parameters characterizing the current vehicle status, the current destination status and the current route status for the route between the vehicle and the destination are classified, categorized, or otherwise assigned to a respective parameter group. For each parameter group, a quantitative viability score and a discrete qualitative viability state are calculated or otherwise determined based on the values of the parameters assigned to that parameter group. Thus, each potential destination has a plurality of parameter group viability scores and a plurality of parameter group viability states associated therewith which are indicative of the current viability of that destination.

Each destination is then classified, categorized, or otherwise assigned to a particular aggregate viability group based on its associated parameter group viability states. In this regard, each aggregate viability group is a unique subset of the potential destinations having substantially the same viability across the parameter groups. Within each viability group, the destinations are then ranked, sorted, or otherwise ordered relative to other destinations in that group based on their associated parameter group viability scores. A listing of the potential destinations can then be displayed or otherwise presented, with the destinations within the listing being ranked, sorted, or otherwise ordered primarily by their viability groupings, and then ranked, sorted, or otherwise ordered secondarily within the viability groupings in a manner that reflects the parameter group viability scores. In this regard, destinations in the higher viability groups are displayed preferentially (or with precedence) over destinations in lower viability groups, and within those groups, destinations having higher quantitative viability are displayed preferentially (or with precedence) over destinations in that group. Thus, a vehicle operator can quickly discern which destinations are more or less viable relative to other destinations.

Additionally, graphical indicia representative of the parameter group viability states associated with each potential destination may also be displayed in association with the destination. Thus, a vehicle operator or other user can also quickly ascertain each potential destination's qualitative viability across a number of different categories, while concurrently gauging that destination's qualitative viability relative to other potential destinations. The graphical indicia representative of the parameter group viability states associated with each potential destination may also be utilized to graphically represent that particular destination on a navigational map, for example, by displaying graphical indicia representative of the parameter group viability states for a destination on the navigational map at the location corresponding to the geographic location of that destination. Thus, a vehicle operator or other user can concurrently achieve situational awareness of the viability characteristics of particular destination displayed on the navigational map while also maintaining awareness of the location of that destination relative to the vehicle.

For example, in one or more embodiments, as described in greater detail below in the context of FIGS. 7-8, the current (or most recent) or anticipated values for base parameters representative of (or indicative of) a current or anticipated status of the aircraft at one or more locations along the flight path segment (e.g., fuel remaining, aircraft weight, altitude, airspeed, heading, mechanical configuration, and the like) may be obtained using systems onboard the aircraft, while current (or most recent) or anticipated values for base parameters representative of (or indicative of) the current status of potential diversion airports may be obtained from external systems. For each potential diversion airport, parameter group viability states and parameter group viability scores are determined for each of a plurality of parameter groups using the base parameter values for the aircraft status and the base parameter values for the airport status, along with any base parameter values characterizing the current or anticipated status of the route to/from the airport and/or complex parameter values calculated for the airport using the base parameters. The potential diversion airports are then classified into different airport viability groupings, and then the airports are ranked within their associated viability grouping based on their associated viability scores for the parameter groups. The highest ranked airport within the grouping having the highest viability is identified as the recommended diversion airport with respect to the flight path segment being analyzed, and a corresponding notification is provided to the pilot or other user.

Aircraft System Overview

Referring now to FIG. 1, an exemplary embodiment of a system 100 which may be located onboard a vehicle, such as an aircraft 102, includes, without limitation, a display device 104, a user input device 106, a processing system 108, a display system 110, a communications system 112, a navigation system 114, a flight management system (FMS) 116, one or more avionics systems 118, one or more detection systems 120, and one or more data storage elements 122, 124 cooperatively configured to support operation of the system 100, as described in greater detail below.

In exemplary embodiments, the display device 104 is realized as an electronic display capable of graphically displaying flight information or other data associated with operation of the aircraft 102 under control of the display system 110 and/or processing system 108. In this regard, the display device 104 is coupled to the display system 110 and the processing system 108, wherein the processing system 108 and the display system 110 are cooperatively configured to display, render, or otherwise convey one or more graphical representations or images associated with operation of the aircraft 102 on the display device 104. For example, as described in greater detail below, a navigational map that includes a graphical representation of the aircraft 102 and one or more of the terrain, meteorological conditions, airspace, air traffic, navigational reference points, and a route associated with a flight plan of the aircraft 102 may be displayed, rendered, or otherwise presented on the display device 104.

The user input device 106 is coupled to the processing system 108, and the user input device 106 and the processing system 108 are cooperatively configured to allow a user (e.g., a pilot, co-pilot, or crew member) to interact with the display device 104 and/or other elements of the aircraft system 100, as described in greater detail below. Depending on the embodiment, the user input device 106 may be realized as a keypad, touchpad, keyboard, mouse, touch panel (or touchscreen), joystick, knob, line select key or another suitable device adapted to receive input from a user. In some embodiments, the user input device 106 is realized as an audio input device, such as a microphone, audio transducer, audio sensor, or the like, that is adapted to allow a user to provide audio input to the aircraft system 100 in a "hands free" manner without requiring the user to move his or her hands, eyes and/or head to interact with the aircraft system 100.

The processing system 108 generally represents the hardware, circuitry, processing logic, and/or other components configured to facilitate communications and/or interaction between the elements of the aircraft system 100 and perform additional processes, tasks and/or functions to support operation of the aircraft system 100, as described in greater detail below. Depending on the embodiment, the processing system 108 may be implemented or realized with a general purpose processor, a controller, a microprocessor, a microcontroller, a content addressable memory, a digital signal processor, an application specific integrated circuit, a field programmable gate array, any suitable programmable logic device, discrete gate or transistor logic, processing core, discrete hardware components, or any combination thereof, designed to perform the functions described herein. In practice, the processing system 108 includes processing logic that may be configured to carry out the functions, techniques, and processing tasks associated with the operation of the aircraft system 100 described in greater detail below. Furthermore, the steps of a method or algorithm described in connection with the embodiments disclosed herein may be embodied directly in hardware, in firmware, in a software module executed by the processing system 108, or in any practical combination thereof. In accordance with one or more embodiments, the processing system 108 includes or otherwise accesses a data storage element 124, such as a memory (e.g., RAM memory, ROM memory, flash memory, registers, a hard disk, or the like) or another suitable non-transitory short or long term storage media capable of storing computer-executable programming instructions or other data for execution that, when read and executed by the processing system 108, cause the processing system 108 to execute and perform one or more of the processes, tasks, operations, and/or functions described herein.

The display system 110 generally represents the hardware, firmware, processing logic and/or other components configured to control the display and/or rendering of one or more displays pertaining to operation of the aircraft 102 and/or systems 112, 114, 116, 118, 120 on the display device 104 (e.g., synthetic vision displays, navigational maps, and the like). In this regard, the display system 110 may access or include one or more databases 122 suitably configured to support operations of the display system 110, such as, for example, a terrain database, an obstacle database, a navigational database, a geopolitical database, a terminal airspace database, a special use airspace database, or other information for rendering and/or displaying navigational maps and/or other content on the display device 104. In this regard, in addition to including a graphical representation of terrain, a navigational map displayed on the display device 104 may include graphical representations of navigational reference points (e.g., waypoints, navigational aids, distance measuring equipment (DMEs), very high frequency omnidirectional radio ranges (VORs), and the like), designated special use airspaces, obstacles, and the like overlying the terrain on the map.

As described in greater detail below, in an exemplary embodiment, the processing system 108 includes or otherwise accesses a data storage element 124 (or database), which maintains information regarding airports and/or other potential landing locations (or destinations) for the aircraft 102. In this regard, the data storage element 124 maintains an association between a respective airport, its geographic location, runways (and their respective orientations and/or directions), instrument procedures (e.g., approaches, arrival routes, and the like), airspace restrictions, and/or other information or attributes associated with the respective airport (e.g., widths and/or weight limits of taxi paths, the type of surface of the runways or taxi path, and the like). Additionally, in accordance with one or more embodiments, the data storage element 124 also maintains airport status information for the runways and/or taxi paths at the airport indicating whether or not a particular runway and/or taxi path is currently operational along with directional information for the taxi paths (or portions thereof). The data storage element 124 may also be utilized to store or maintain other information pertaining to the airline or aircraft operator (e.g., contractual agreements or other contractual availability information for particular airports, maintenance capabilities or service availability information for particular airports, and the like) along with information pertaining to the pilot and/or co-pilot of the aircraft (e.g., experience level, licensure or other qualifications, work schedule or other workload metrics, such as stress or fatigue estimates, and the like).

In exemplary embodiments described in the context of FIGS. 9-16, the data storage element 124 also maintains landing preference information associated with the pilot, the aircraft operator, the airline, or the like. In this regard, the landing preference information may be utilized to preferentially weight particular airports, particular topographies, particular meteorological conditions, and potentially other factors that may impact the relative desirability of using a particular airport as a diversion destination. For example, a pilot may define certain airports that he or she prefers to utilize or land at along with certain airports that he or she prefers to avoid, or airline contractual agreements or other availability information pertaining to a particular airport may make that airport more or less preferable. Similarly, a pilot may define certain topographical or geographical features that he or she prefers to utilize or land at, or certain topographical or geographical features that he or she prefers to avoid. Additionally, the pilot may define weightings or preferences for various airport characteristics or statuses, meteorological conditions at or near the airport, or the like, which may be utilized to adjust the relative preference or weighting assigned to a particular airport based on its current or forecasted operating status in real-time. Using the preference information, the processing system 108 determines density distributions representative of airport suitability and landing preferences for a geographic area along the flight path defined by the flight plan, which, in turn, is utilized to identify segment boundary locations and divide the flight plan into segments for defining potential diversion destinations along the flight plan.

Still referring to FIG. 1, in an exemplary embodiment, the processing system 108 is coupled to the navigation system 114, which is configured to provide real-time navigational data and/or information regarding operation of the aircraft 102. The navigation system 114 may be realized as a global positioning system (GPS), inertial reference system (IRS), or a radio-based navigation system (e.g., VHF omni-directional radio range (VOR) or long range aid to navigation (LORAN)), and may include one or more navigational radios or other sensors suitably configured to support operation of the navigation system 114, as will be appreciated in the art. The navigation system 114 is capable of obtaining and/or determining the instantaneous position of the aircraft 102, that is, the current (or instantaneous) location of the aircraft 102 (e.g., the current latitude and longitude) and the current (or instantaneous) altitude (or above ground level) for the aircraft 102. The navigation system 114 is also capable of obtaining or otherwise determining the heading of the aircraft 102 (i.e., the direction the aircraft is traveling in relative to some reference).

In an exemplary embodiment, the processing system 108 is also coupled to the FMS 116, which is coupled to the navigation system 114, the communications system 112, and one or more additional avionics systems 118 to support navigation, flight planning, and other aircraft control functions in a conventional manner, as well as to provide real-time data and/or information regarding the operational status of the aircraft 102 to the processing system 108. It should be noted that although FIG. 1 depicts a single avionics system 118, in practice, the aircraft system 100 and/or aircraft 102 will likely include numerous avionics systems for obtaining and/or providing real-time flight-related information that may be displayed on the display device 104 or otherwise provided to a user (e.g., a pilot, a co-pilot, or crew member). For example, practical embodiments of the aircraft system 100 and/or aircraft 102 will likely include one or more of the following avionics systems suitably configured to support operation of the aircraft 102: a weather system, an air traffic management system, a radar system, a traffic avoidance system, an autopilot system, an autothrust system, a flight control system, hydraulics systems, pneumatics systems, environmental systems, electrical systems, engine systems, trim systems, lighting systems, crew alerting systems, electronic checklist systems, an electronic flight bag and/or another suitable avionics system.

In the illustrated embodiment, the onboard detection system(s) 120 generally represents the component(s) of the aircraft 102 that are coupled to the processing system 108 and/or the display system 110 to generate or otherwise provide information indicative of various objects or regions of interest within the vicinity of the aircraft 102 that are sensed, detected, or otherwise identified by a respective onboard detection system 120. For example, an onboard detection system 120 may be realized as a weather radar system or other weather sensing system that measures, senses, or otherwise detects meteorological conditions in the vicinity of the aircraft 102 and provides corresponding radar data (e.g., radar imaging data, range setting data, angle setting data, and/or the like) to one or more of the other onboard systems 108, 110, 114, 116, 118 for further processing and/or handling. For example, the processing system 108 and/or the display system 110 may generate or otherwise provide graphical representations of the meteorological conditions identified by the onboard detection system 120 on the display device 104 (e.g., on or overlying a lateral navigational map display). In another embodiment, an onboard detection system 120 may be realized as a collision avoidance system that measures, senses, or otherwise detects air traffic, obstacles, terrain and/or the like in the vicinity of the aircraft 102 and provides corresponding detection data to one or more of the other onboard systems 108, 110, 114, 116, 118.

In the illustrated embodiment, the processing system 108 is also coupled to the communications system 112, which is configured to support communications to and/or from the aircraft 102 via a communications network. For example, the communications system 112 may also include a data link system or another suitable radio communication system that supports communications between the aircraft 102 and one or more external monitoring systems, air traffic control, and/or another command center or ground location. In this regard, the communications system 112 may allow the aircraft 102 to receive information that would otherwise be unavailable to the pilot and/or co-pilot using the onboard systems 114, 116, 118, 120. For example, the communications system 112 may receive meteorological information from an external weather monitoring system, such as a Doppler radar monitoring system, a convective forecast system (e.g., a collaborative convective forecast product (CCFP) or national convective weather forecast (NCWF) system), an infrared satellite system, or the like, that is capable of providing information pertaining to the type, location and/or severity of precipitation, icing, turbulence, convection, cloud cover, wind shear, wind speed, lightning, freezing levels, cyclonic activity, thunderstorms, or the like along with other weather advisories, warnings, and/or watches. The meteorological information provided by an external weather monitoring system may also include forecast meteorological data that is generated based on historical trends and/or other weather observations, and may include forecasted meteorological data for geographical areas that are beyond the range of any weather detection systems 120 onboard the aircraft 102. In other embodiments, the processing system 108 may store or otherwise maintain historic meteorological data previously received from an external weather monitoring system, with the processing system 108 calculating or otherwise determining forecast meteorological for geographic areas of interest to the aircraft 102 based on the stored meteorological data and the current (or most recently received) meteorological data from the external weather monitoring system. In this regard, the meteorological information from the external weather monitoring system may be operationally used to obtain a "big picture" strategic view of the current weather phenomena and trends in its changes in intensity and/or movement with respect to prospective operation of the aircraft 102.

It should be understood that FIG. 1 is a simplified representation of the aircraft system 100 for purposes of explanation and ease of description, and FIG. 1 is not intended to limit the application or scope of the subject matter described herein in any way. It should be appreciated that although FIG. 1 shows the display device 104, the user input device 106, and the processing system 108 as being located onboard the aircraft 102 (e.g., in the cockpit), in practice, one or more of the display device 104, the user input device 106, and/or the processing system 108 may be located outside the aircraft 102 (e.g., on the ground as part of an air traffic control center or another command center) and communicatively coupled to the remaining elements of the aircraft system 100 (e.g., via a data link and/or communications system 112). In this regard, in some embodiments, the display device 104, the user input device 106, and/or the processing system 108 may be implemented as an electronic flight bag that is separate from the aircraft 102 but capable of being communicatively coupled to the other elements of the aircraft system 100 when onboard the aircraft 102. Similarly, in some embodiments, the data storage element 124 may be located outside the aircraft 102 and communicatively coupled to the processing system 108 via a data link and/or communications system 112. Furthermore, practical embodiments of the aircraft system 100 and/or aircraft 102 will include numerous other devices and components for providing additional functions and features, as will be appreciated in the art. In this regard, it will be appreciated that although FIG. 1 shows a single display device 104, in practice, additional display devices may be present onboard the aircraft 102. Additionally, it should be noted that in other embodiments, features and/or functionality of processing system 108 described herein can be implemented by or otherwise integrated with the features and/or functionality provided by the display system 110 or the FMS 116, or vice versa. In other words, some embodiments may integrate the processing system 108 with the display system 110 or the FMS 116; that is, the processing system 108 may be a component of the display system 110 and/or the FMS 116.

Diversion Airport Selection

Referring now to FIG. 2, in an exemplary embodiment, the system 100 is configured to support a route diversion selection process 200 and perform additional tasks, functions, and operations described below. The various tasks performed in connection with the illustrated process 200 may be implemented using hardware, firmware, software executed by processing circuitry, or any combination thereof. For illustrative purposes, the following description may refer to elements mentioned above in connection with FIG. 1. In practice, portions of the route diversion selection process 200 may be performed by different elements of the system 100, such as, the processing system 108, the display system 110, the communications system 112, the navigation system 114, the FMS 116, the onboard avionics systems 118 and/or the onboard detection systems 120. It should be appreciated that the route diversion selection process 200 may include any number of additional or alternative tasks, the tasks need not be performed in the illustrated order and/or the tasks may be performed concurrently, and/or the route diversion selection process 200 may be incorporated into a more comprehensive procedure or process having additional functionality not described in detail herein. Moreover, one or more of the tasks shown and described in the context of FIG. 2 could be omitted from a practical embodiment of the route diversion selection process 200 as long as the intended overall functionality remains intact.

In one or more embodiments, the route diversion selection process 200 is performed with respect to a particular flight plan prior to departure of the aircraft along that flight plan. For example, the route diversion selection process 200 may be performed while the aircraft is on the ground to enable a pilot to review the route defined by the flight plan and designate his or her desired diversion (or alternate) destinations along the route for use in the event of an emergency or other situation necessitating a diversion.

In an exemplary embodiment, the route diversion selection process 200 begins by identifying or otherwise determining a flight path segment for which potential diversion destinations should be analyzed (task 202). In this regard, the route defined by the flight plan may be subdivided into a series of consecutive segments that make up the route. As described in greater detail below in the context of FIGS. 9-16, in exemplary embodiments described herein, the selection process 200 automatically divides the route of the flight plan in accordance with segmentation criteria by performing or invoking a flight plan segmentation process. For example, in one or more embodiments, the pilot, co-pilot, or the like may manipulate a GUI display to define the number segments for which the flight plan route should be divided into, and/or a length (e.g., geographic distance and/or flight time duration) or an acceptable range thereof associated with the respective segments. In this regard, the selection process 200 may automatically divide the route of the flight plan into a number of segments having respective lengths or durations that fall within the range or otherwise satisfy the segmentation criteria provided by the pilot, aircraft operator, or the like. In one or more embodiments, the flight path segments are defined independent of the navigational reference points that define the route of the flight plan. For example, a respective flight path segment may begin at a first geographic location along the flight plan route between two successive navigational reference points defining the flight plan route and end at a second geographic location along the flight plan route between another set of navigational reference points. That said, in other embodiments, the flight path segments may be defined by the navigational reference points of the flight plan. For example, a segment boundary may be set to the navigational reference point along the flight plan that is nearest an extrema of the airport suitability density distributions, as described in greater detail below.

When the aircraft has not yet begun executing the flight plan, the route diversion selection process 200 begins by analyzing the initial flight path segment closest to the departure location and proceeds sequentially through the flight path segments from the departure location to the destination location until a diversion airport has been selected for each flight path segment. That said, in other embodiments, the route diversion selection process 200 may begin at other locations within the route of the flight plan. For example, when performed during operation of the aircraft in accordance with the flight plan, the route diversion selection process 200 may begin by identifying and analyzing a flight path segment that the aircraft is currently traversing.

After identifying the flight path segment of interest, the selection process 200 continues by identifying or otherwise determining a subset of potential airports to be analyzed with respect to that flight path segment based on the flight path segment (task 204). In this regard, the selection process 200 may apply one or more filtering criteria to all of the potential diversion destinations within a geographic area encompassing the entire route of the flight plan to reduce the number of diversion destinations for analysis as those most relevant to the flight path segment of interest. For example, the selection process 200 may filter or otherwise exclude from further analysis any airports that are not within a threshold geographic distance of the flight path segment, within a threshold flight time of the flight path segment, and/or require more than a threshold amount of fuel to reach from one or more locations along or throughout the entire duration of the flight path segment. In this regard, the selection process 200 may individually analyze discrete locations along the flight path segment to ensure that each airport retained in the subset is likely to be within the threshold distance or flight time of the aircraft during operation along that flight path segment and be reachable by the aircraft given the current or anticipated amount of fuel onboard.

For example, the selection process 200 may confirm that at least the starting location of the flight path segment, the ending location of the flight path segment, and one or more intermediate locations along the flight path segment (e.g., the midpoint between the starting and ending locations) are each within the threshold distance or flight time of a potential diversion airport, otherwise that particular potential diversion airport is excluded from further analysis with respect to the flight path segment. In one or more embodiments, the threshold distance or flight time is calculated or otherwise determined based on the anticipated amount of fuel remaining onboard the aircraft at one or more locations along the flight path segment being analyzed (e.g., the predicted amount of fuel remaining at the end of the flight path segment). In other embodiments, the pilot or other user may define (e.g., via one or more GUI elements) the filtering criteria to be utilized to limit the diversion destinations considered. In one embodiment, the currently displayed geographic area of a navigational map displayed on the display device 104 is used as a filtering criterion, such that only airports or destinations within the displayed geographic area are considered by excluding airports that are not located within the displayed geographic area.

Still referring to FIG. 2, after identifying the subset of airports to be analyzed, the selection process 200 continues by ranking, prioritizing, or otherwise ordering the airports within the subset of airports relevant to the flight path segment in terms of their relative viabilities with respect to the aircraft, and generating or otherwise providing graphical indicia of the recommended airport(s) with respect to the flight path segment (tasks 206, 208). In exemplary embodiments, as described in greater detail below in the context of FIGS. 7-8, the route diversion selection process 200 ranks the airports using real-time (or near real-time), forecasted, or anticipated status information and the airports' respective viabilities for various parameter groupings. For example, for each airport of the filtered subset, route diversion selection process 200 receives or otherwise obtains current and/or anticipated status information for the respective airport, such as, for example, current and/or forecasted meteorological conditions, current and/or anticipated operating status of the runways at the airport, current and/or anticipated airspace restrictions at the airport, and the like. The route diversion selection process 200 also obtains status information associated with the flight path segment for the aircraft 102 using the flight plan maintained by the FMS 116, such as, for example, the anticipated altitude (or above ground level) for the aircraft 102 at one or more locations along the flight path segment according to the flight plan, the anticipated locations of the aircraft 102 along the flight path segment, the anticipated aircraft headings at one or more locations along the flight path segment according to the flight plan, the anticipated aircraft velocity along the flight path segment according to the flight plan, the anticipated amount of fuel remaining onboard the aircraft, and the like. In this regard, in some embodiments, the status information associated with the flight path segment for the aircraft 102 may be calculated as an average of the values across the entire length of the flight path segment (e.g., by averaging the altitude at the start of the segment and the altitude at the end of the segment). When the route diversion selection process 200 is performed during execution of the flight path segment being analyzed, the selection process 200 obtains the current real-time status information for the aircraft 102, such as the current or instantaneous altitude, location, heading, velocity, and the like.

As described in greater detail below in the context of FIGS. 7-8, in one or more embodiments, for each airport, a respective parameter group viability score is determined for each of a plurality of parameter groups using the status information for that airport and the aircraft. Additionally, a respective parameter group viability state is determined for each of the plurality of parameter groups for the respective airport. Based on the respective parameter group viability states, the airports are then classified into different aggregate viability groups. In this regard, the airports classified into a respective one of the aggregate viability groups represent a subset of the airports being analyzed having a substantially similar viability status. Each airport is then ranked within its respective viability group based on its respective parameter group viability scores relative to those of other airports within its respective aggregate viability group. Thus, better or more preferred airports may be discerned from other airports with the same general viability. Thereafter, the identified airports within the filtered subset are then ranked or otherwise ordered primarily based on the respective aggregate viability groupings and then secondarily based on each respective airports relative ranking within its respective aggregate viability group, resulting in a prioritized list of the potential diversion destinations for the flight path segment.

In exemplary embodiments, the route diversion selection process 200 highlights, indicates, or otherwise identifies the recommended airport(s) for the flight path segment on the display device 104. For example, a graphical representation of the highest ranked airport may be rendered with a visually distinguishable characteristic to provide a visual cue highlighting that airport relative to the graphical representations of other airports within the filtered subset that was analyzed for the flight path segment. In some embodiments, the selection process 200 generates or otherwise provides an ordered list of the ranked airports, with the recommended airport(s) being preferentially displayed (e.g., at the top of the list, at the left within the list, visually distinguished within the list, etc.).

In one or more embodiments, the route diversion selection process 200 also displays or otherwise presents graphical indicia of the respective parameter group viability states for each airport presented. In this regard, while highlighting the recommended airport(s) or providing an ordered list on the display device 104 allows a pilot or other user to immediately distinguish which airports are most viable from those that are less viable, the parameter group viability state indicia allow the pilot to quickly discern the general viability characteristics associated with each individual airport presented. In exemplary embodiments, each parameter group viability state is rendered with a visually distinguishable characteristic that is different from those of the other parameter group viability states. The visually distinguishing characteristic may include one or more of a visually distinguishable color, hue, tint, brightness, graphically depicted texture or pattern, contrast, transparency, opacity, shading, animation, line type, and/or other graphical effect that visually distinguish a parameter group viability state. In one exemplary embodiment, the route diversion selection process 200 supports three different parameter group viability states, with the visually distinguishing characteristics being realized as three distinct colors. For example, the highest or best parameter group viability state may be indicated using a green color, with the lowest or worst parameter group viability state being indicated using a red color, and the intermediate parameter group viability state being indicated using a yellow color.

In one or more embodiments, the symbologies or representations of the presented airports are selectable, and the route diversion selection process 200 displays or otherwise presents detail information for the respective parameter groups for an individual airport in response to selection of that airport. In this regard, when the user input device 106 is manipulated to select a particular airport on the display device 104, the processing system 108 may generate or otherwise provide a pop-up or other graphical user interface (GUI) display on the display device 104 that includes more specific or detailed information regarding the parameter group viability states for that airport, which may be ordered by perceived relevance. The detail information may include the factors or criteria that primarily governed assigning or classifying a particular viability state to a particular parameter group. For example, in the case of a binary parameter resulting in the lowest viability designation, the detail information may include further information regarding that parameter. Additionally, the detail information may also be displayed or otherwise rendered using the same visually distinguishable characteristic as its associated parameter group viability state. For example, detail information regarding a binary parameter resulting in the lowest viability designation for a particular parameter group may be rendered in red. Conversely, detail information regarding a parameter that contributes to or otherwise results in the highest viability designation for a particular parameter group may be rendered in green.

Still referring to FIG. 2, the selection process 200 continues by designating or otherwise associating an alternate airport with the flight path segment (task 210). In one or more embodiments, the selection process 200 automatically establishes an initial association between the highest ranked (or recommended) airport and the flight path segment. In other embodiments, the selection process 200 establishes the association in response to receiving an input from the pilot or other user indicative of a desired airport from among the subset of airports capable of being associated with the flight path segment (e.g., those remaining in the filtered subset at task 204). In this regard, in some embodiments, the highest ranked airport from the filtered subset may be assigned to the flight path segment by default, but that assignment is capable of being overridden by the pilot. For example, as described in greater detail below in the context of FIG. 3, one or more graphical user interface (GUI) elements may be provided that allow the pilot to select and associate an airport that is not the highest ranked airport with respect to a given flight path segment. In exemplary embodiments, the association between the flight path segment and diversion airport and the corresponding definitions of the flight path segment are maintained in conjunction with the flight plan (e.g., in a data storage element associated with or accessible to the FMS 116) to facilitate providing graphical representations of the flight path segment and the corresponding diversion destination during execution of the flight plan, as described in greater detail below.

In exemplary embodiments, once a diversion airport is associated with a flight path segment, the selection process 200 is repeated for the next flight path segment following that initial flight path segment until a diversion airport has been associated or assigned to each flight path segment of a flight plan. In this regard, the selection process 200 may generate or otherwise provide a diversion airport selection GUI display sequence (or wizard) that steps through the flight path segments of a flight plan to allow the pilot or other user to manually review the highest ranked airport associated with each flight path segment and confirm or override the airport prioritization with respect to that flight path segment. In other embodiments, the selection process 200 may be performed essentially as a background process to automatically assign flight path segments with the highest ranked airport for each flight path segment. For example, in one embodiment, the FMS 116 may automatically divide the flight plan into equally sized flight path segments, and then automatically associates each flight path segment with the highest ranked airport from within the subset of airports satisfying the applicable filtering criteria (e.g., maximum distance, maximum flight time, maximum fuel required, and/or the like) with respect to the respective flight path segment. In such embodiments, the pilot or other user may then subsequently review the flight path segments and associated default diversion airports and modify the number and/or length of the flight path segments and/or modify the diversion airport associated with a respective flight path segment.

Figure 3:
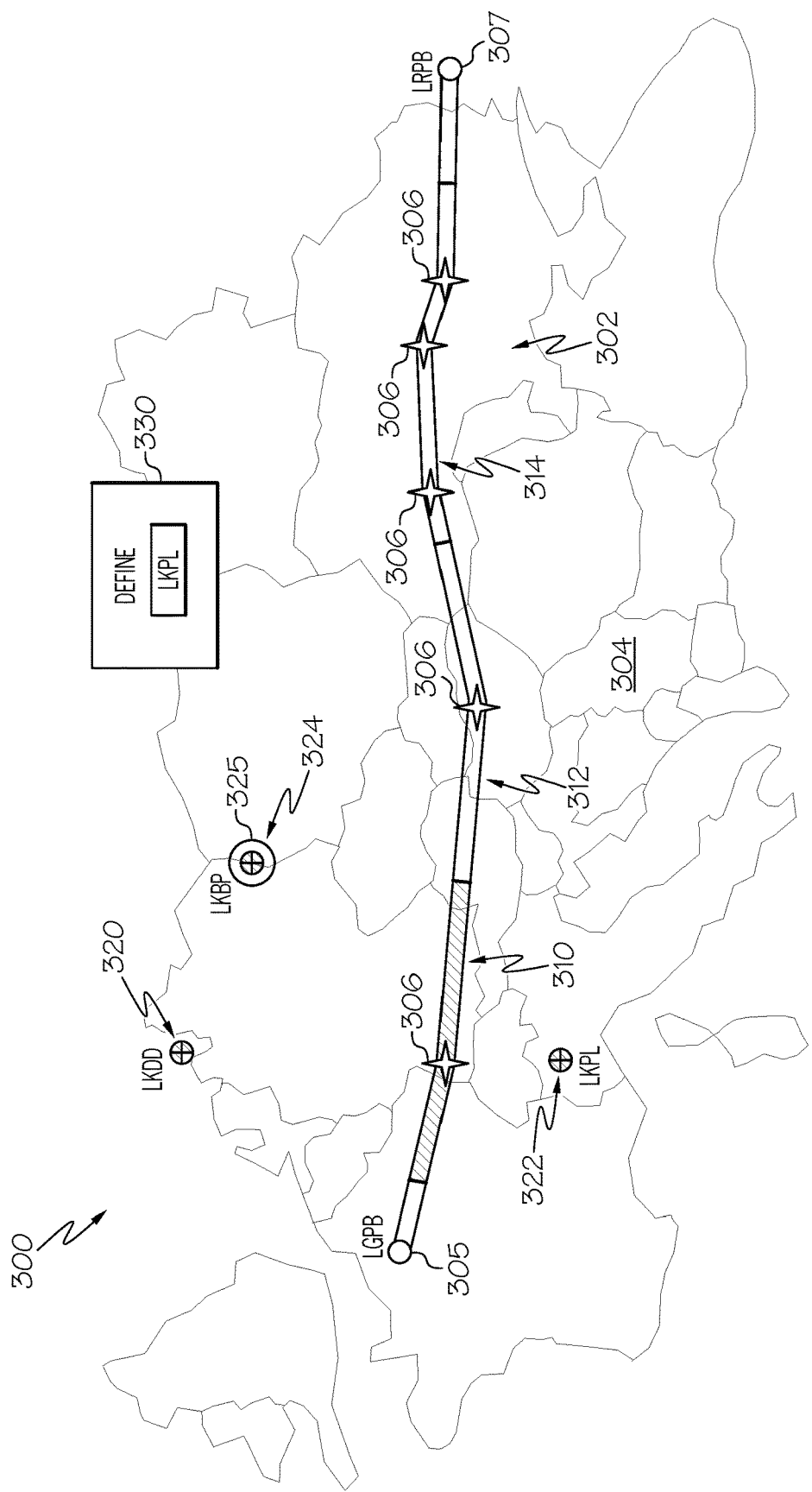
FIG. 3 depicts an exemplary navigational map display suitable for display on a display device associated with the aircraft in the system of FIG. 1 in accordance with one or more embodiments of the route diversion selection process of FIG. 2.

FIG. 3 depicts an exemplary navigational map display 300 that may be displayed, rendered, or otherwise presented by the display system 110 and/or the processing system 108 on the display device 104 in conjunction with the route diversion selection process 200 of FIG. 2. The illustrated navigational map 300 includes a graphical representation 302 of the flight plan overlaid or rendered on top of a background 304. In this regard, FIG. 3 depicts a flight plan 302 including five navigational reference points 306 defining a route from an initial departure location 305 (e.g., airport LGPB) to a destination (or arrival) location 307 (e.g., airport LRPB). In the illustrated embodiment, the map 300 is centered on the flight plan 302 such that the center location of the navigational map 300 corresponds to the midpoint of the flight plan 302. That said, in alternative embodiments, the center location of the navigational map 300 may correspond to a geographic location that is independent of the flight plan 302, for example, when a user manipulates a user input device 106 to scroll the displayed area of the navigational map or select a portion of the displayed area that does not include the flight plan 302.

The background 304 comprises a graphical representation of the terrain, topology, navigational reference points, airspace designations and/or restrictions, or other suitable items or points of interest corresponding to the currently displayed area of the navigational map 300, which may be maintained in a terrain database, a navigational database, a geopolitical database, or another suitable database. For example, the display system 110 may render a graphical representation of nearby navigational aids (e.g., VORs, VORTACs, DMEs, and the like) and airports within the currently displayed geographic area of the navigational map 300 overlying the background 304. Some embodiments of navigational map 300 may also include graphical representations of airspace designations and/or airspace restrictions, cities, towns, roads, railroads, and other geo-political information. In addition, depending on the embodiment, other real-time flight related information that is within the geographic area corresponding to the currently displayed area of the navigational map 300 or within a particular proximity of the aircraft may be rendered on the map 300, such as, for example, weather conditions, radar data, neighboring air traffic, and the like, as will be appreciated in the art. Although FIG. 3 depicts a top view of the navigational map 300 (alternatively referred to as a lateral map or lateral view), in practice, alternative embodiments may utilize various perspective views, such as side views, three-dimensional views (e.g., a three-dimensional synthetic vision display), angular or skewed views, and the like.

The illustrated map 300 corresponds to an instance of the selection process 200 being performed prior to the aircraft 102 departing the departure location (e.g., airport LGPB). That said, in other embodiments, the navigational map 300 is associated with the movement of the aircraft 102, includes a graphical representation of the aircraft 102 overlying the background 304, and the aircraft symbology and/or background 304 refreshes or otherwise updates as the aircraft 102 travels, such that the graphical representation of the aircraft 102 is positioned over the terrain background 304 in a manner that accurately reflects the current (e.g., instantaneous or substantially real-time) real-world positioning of the aircraft 102 relative to the earth. For example, in some embodiments, the aircraft symbology is shown as traveling across the navigational map 300 (e.g., by updating the location of the aircraft symbology with respect to the background 304), while in other embodiments, the aircraft symbology may be located at a fixed position on the navigational map 300 (e.g., by updating the background 304 with respect to the aircraft graphic such that the map 300 is maintained centered on and/or aligned with the aircraft graphic). Additionally, depending on the embodiment, the navigational map 300 may be oriented in a cardinal direction (e.g., oriented north-up so that moving upward on the map 300 corresponds to traveling northward), or alternatively, the orientation of the navigational map 300 may be track-up or heading-up (i.e., aligned such that the aircraft symbology is always traveling in an upward direction and the background 304 adjusted accordingly).

In the illustrated embodiment, the flight plan 302 is divided into three flight path segments 310, 312, 314 defined independently of the navigational reference points 306. For example, the length of the portion of the route defined by the flight plan 302 that is not within a threshold distance of the departure location 305, (e.g., the portion where an alternate or diversion airport does not need to be defined) may be automatically divided into a predefined number of flight path segments (e.g., four segments) having substantially equal length. Alternatively, the flight plan 302 may be automatically divided into flight path segments having a predefined distance. That said, in other embodiments, the pilot or other user may manipulate one or more GUI elements to add or remove flight path segments as well as increase and/or decrease the length of one or more flight path segments (e.g., by dragging an end of a flight path segment along the flight plan 302 in the desired direction). In yet other alternative embodiments, the flight plan 302 may be divided into flight path segments defined by the consecutive waypoints (e.g., six segments between departure and destination locations 305, 307).

Referring to FIGS. 2-3, in response to identifying a flight path segment of interest, such as initial flight path segment 310 (e.g., task 202), the display system 110 and/or the processing system 108 graphically indicates or otherwise highlights the flight path segment 310 being analyzed on the display device 104, for example, by rendering the flight path segment 310 with a visually distinguishable fill pattern or other visually distinguishable characteristic. As described above, the selection process 200 identifies a subset of airports 320, 322, 324 satisfying applicable filtering criteria with respect to the flight path segment 310 and displays, renders, or otherwise graphically indicates the potential diversion airports 320, 322, 324 for the flight path segment 310 on the map 300. In exemplary embodiments, the airport symbology presented on the navigational map 300 includes graphical indicia representative of the parameter group viability states for the displayed airports 320, 322, 324. For example, a consolidated graphical indicia, such as a pie chart where the different sectors (or slices) are representative of the different parameter groups, may also be utilized for the airport symbology 320, 322, 324. In this regard, FIG. 3 depicts an embodiment where four different parameter groups are being utilized to rank the airports, however, it should be appreciated that the subject matter is not intended to be limited to any particular number of parameter groups. It should be noted that the subject matter described herein is not limited to pie charts, and other similar graphics may be utilized to represent the parameter group states in a consolidated manner. In this regard, a concise representation allows for faster orientation and understanding of the relative airport viability and components thereof.

In the embodiment of FIG. 3, each of the sectors of the pie chart indicia for the airports 322, 324 having the highest viability are rendered using the visually distinguishable characteristic associated with the highest parameter group viability state (e.g., green). In this manner, the pilot of the aircraft 102 can quickly identify those airports 322, 324 as having the highest viability state across the various parameter groups with respect to the current flight path segment 310 being analyzed. The display system 110 and/or the processing system 108 also displays, renders, or otherwise provides an additional visually distinguishable graphical indication 325 associated with the LKBP airport symbology 324 to indicate that airport LKBP is recommended or highest ranked with respect to flight path segment 310. Thus, a pilot can quickly identify that airport LKBP 324 was scored higher than the other airports 320, 322 with respect to the current flight path segment 310. In some embodiments, an ordered list of the potential airports for the flight path segment of interest may be displayed on the map 300. For example, a list including a graphical representation of airport LKBP 324 preferentially displayed over the remaining airports 320, 322 may be displayed on the navigational map 304, with a graphical representation of airport LKPL 322 being preferentially displayed over airport LKDD 320, thereby allowing the pilot to quickly ascertain the relative viability of all of the depicted airports 320, 322, 324.

One or more of the sectors of the pie chart indicia for the airport symbology 320 associated with the airport having an intermediate or low viability are rendered using the visually distinguishable characteristic associated with the corresponding intermediate or lower parameter group viability state (e.g., yellow, red, or the like), while remaining sectors of the pie chart indicia 410 for each respective airport are rendered using the visually distinguishable characteristic associated with the highest parameter group viability state (e.g., green). Thus, the pilot of the aircraft 102 can quickly identify the number of parameter groups for airport LKDD 320 that do not have the highest viability state, as well as identify which parameter group(s) could potentially compromise or complicate landing at airport LKDD 320.

In one or more embodiments, the airport symbology 320, 322, 324 is selectable or otherwise manipulable by a user to designate and thereby assign a particular diversion airport to the flight path segment 310 being analyzed. That said, in other embodiments, a GUI element 330, such as a window or drop box, or another GUI display may be presented on the display device 104 (e.g., on, overlying, or adjacent to the map 300) that allows the user to manually input the desired diversion airport by selecting, activating, manipulating, or otherwise interacting with the respective GUI element 330 (e.g., textually, via speech recognition, dragging and dropping the airport symbology for the desired airport, or the like). For example, FIG. 3 depicts an example where the pilot drags and drops the LKPL symbol 322 into the alternate airport selection box 330 to thereby override and designate LKPL as the alternate airport for the flight path segment 310 instead of the more highly ranked LKBP airport. In response to identifying selection of a desired diversion airport for the flight path segment 310 being analyzed, the processing system 108 updates the flight plan data maintained in the data storage element 124 to include information identifying the desired diversion airport in association with the information defining the flight path segment 310 for which the selected diversion airport is active or otherwise applicable.

After selection of an airport for association with the flight path segment 310, the display system 110 and/or the processing system 108 may update the navigational map 300 by removing the displayed airports 320, 322, 324, deemphasizing the previously analyzed flight path segment 310, and sequentially proceeding to the next flight segment 312. In this regard, the selection process 200 repeats by graphically indicating or highlighting the next flight path segment 312 to be analyzed on the display device 104 along with providing graphical representations of the potential diversion airports associated with the next flight path segment 312, graphical indicia of the recommended or highest ranked diversion airport for the next flight path segment 312, graphical indicia of the relative viabilities of the potential diversion airports presented, and so on until diversion airports have been designated or otherwise associated with flight path segments 312, 314 that make up the remainder of the flight plan 302.

Figure 4:
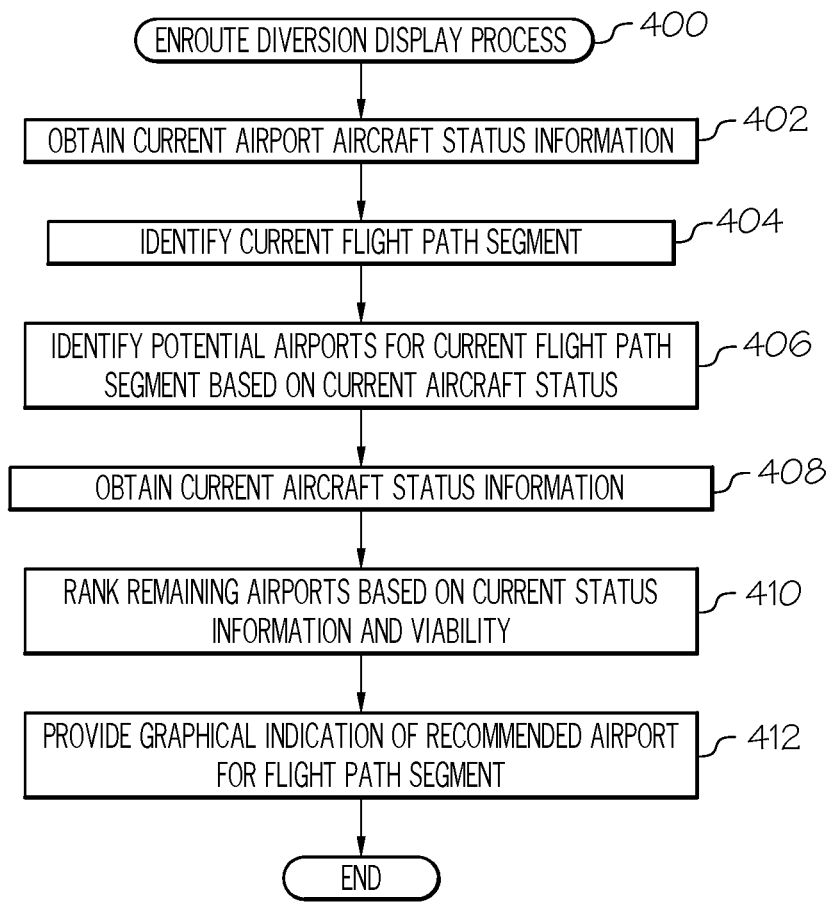
FIG. 4 is a flow diagram of an exemplary en route diversion display process suitable for use with the aircraft in the system of FIG. 1 in accordance with one or more embodiments.

FIG. 4 depicts an exemplary embodiment of an en route diversion display diversion display process 400 suitable for implementation by the system 100 in conjunction with the route diversion selection process 200 of FIG. 2. The various tasks performed in connection with the illustrated diversion display process 400 may be implemented using hardware, firmware, software executed by processing circuitry, or any combination thereof. For illustrative purposes, the following description may refer to elements mentioned above in connection with FIG. 1. In practice, portions of the en route diversion display diversion display process 400 may be performed by different elements of the system 100, such as, the processing system 108, the display system 110, the communications system 112, the navigation system 114, the FMS 116, the onboard avionics systems 118 and/or the onboard detection systems 120. It should be appreciated that the en route diversion display diversion display process 400 may include any number of additional or alternative tasks, the tasks need not be performed in the illustrated order and/or the tasks may be performed concurrently, and/or the en route diversion display diversion display process 400 may be incorporated into a more comprehensive procedure or process having additional functionality not described in detail herein. Moreover, one or more of the tasks shown and described in the context of FIG. 4 could be omitted from a practical embodiment of the diversion display diversion display process 400 as long as the intended overall functionality remains intact.

In one or more exemplary embodiments, the en route diversion display diversion display process 400 is performed while the aircraft 102 is en route along a flight plan for which the selection process 200 has previously been performed to designate or associate diversion destinations along the route. In such embodiments, the en route diversion display diversion display process 400 dynamically analyzes the viability of the potential diversion airports for the current flight path segment actively being flown by the aircraft 102 based on current real-time status information associated with the aircraft 102 and the diversion airports and notifies the pilot or other user associated with operation of the aircraft 102 when the recommended or highest ranked diversion destination is different from one previously associated with the current flight path segment. That said, in other embodiments, the en route diversion display diversion display process 400 may also be performed without diversion destinations being previously selected along the route, in which case, the en route diversion display diversion display process 400 dynamically indicates a recommended diversion airport to the pilot in real-time.

In an exemplary embodiment, the en route diversion display diversion display process 400 begins by receiving or otherwise obtaining current status information associated with the aircraft (task 402). The current status information pertaining to the aircraft 102 generally represents the instantaneous, real-time or most recent available values for one or more parameters that quantify the current operation of the aircraft 102. In this regard, the current aircraft status information provides one or more base parameters for scoring or otherwise grading the viability of an airport with respect to one or more parameter groups, as described in greater detail below. For example, the processing system 108 may obtain (e.g., from FMS 116, navigation system 114 and/or other avionic systems 118) one or more of the following: the current flight phase for the aircraft 102, the current location of the aircraft 102 (or a particular distance from a navigational reference point or a desired track), the current altitude (or above ground level) of the aircraft 102, the current heading (or bearing) of the aircraft 102, the current amount of fuel remaining onboard the aircraft 102, the current engine status (e.g., whether any engine is disabled, whether afterburners are in operation, the current revolutions per minute, and/or the like), the current aircraft configuration (e.g., the current flap configuration). Additionally, the processing system 108 may obtain, either from the onboard detection systems 120 or an external system via communications system 112, current meteorological conditions at or near the current location of the aircraft 102 (e.g., the current temperature, wind speed, wind direction, atmospheric pressure, turbulence, and the like), the current air traffic or other obstacles at or near the current location of the aircraft 102, and the like.

The diversion display process 400 continues by identifying or otherwise determining the flight path segment for which potential diversion destinations should be analyzed (task 404). In this regard, using the current location, the current heading, the current velocity or airspeed, and the like, the diversion display process 400 identifies which of the flight path segments associated with the flight plan should be analyzed based on the aircraft's current status along the route. In one or more exemplary embodiments, the diversion display process 400 identifies the flight path segment that most closely corresponds to the current aircraft location and heading as the flight path segment to be analyzed, that is, the flight path segment the aircraft 102 is currently traveling along (i.e., the current flight path segment). For example, the processing system 108 may compare the current geographic location of the aircraft 102 with the information defining the flight path segments that the flight plan is divided into (e.g., task 202), and then identify which flight path segment the current aircraft location matches or otherwise corresponds to. In this regard, the current aircraft heading may also be utilized to resolve any ambiguities at or near the transition between flight path segments.

In some embodiments, when the current aircraft location is within a threshold distance of the ending location for the current flight path segment, the processing system 108 may select or otherwise identify the next flight path segment following the flight path segment the aircraft 102 is currently traveling along for analysis. In other words, based on the current location, heading and/or velocity of the aircraft 102 with respect to the end of the current flight path segment, the diversion display process 400 may intelligently identify that a future flight path segment should be analyzed due to the unlikelihood of a diversion before the aircraft 102 finishes traveling the current flight path segment. That said, for purposes of explanation, the subject matter may be described herein primarily in the context of the current flight path segment the aircraft 102 is currently traveling along.

Once the flight path segment to be analyzed is identified, the diversion display process 400 continues by analyzing potential diversion airports with respect to the remaining portion of that flight path segment yet to be flown by the aircraft based on the current status information associated with the aircraft along with the current status information associated with the potential diversion airports (tasks 406, 408, 410). In a similar manner as described above, in exemplary embodiments, the diversion display process 400 continues by identifying or otherwise determining a subset of potential airports to be analyzed with respect to the current flight path segment based on the current aircraft status information and the remaining flight path segment. In this regard, the diversion display process 400 may similarly apply one or more filtering criteria to reduce the number of diversion destinations for analysis to those most relevant to the remaining portion of the flight path segment yet to be flown ahead of the current aircraft location. For example, starting from the current aircraft location, the diversion display process 400 may individually analyze discrete locations ahead of the aircraft along the current flight path segment to ensure that each airport retained in the subset is likely to be within the threshold distance or flight time of the aircraft during future operation along the flight path segment. In a similar manner as described above, the selection process 200 may confirm that at least the current location of the aircraft 102, the ending location of the flight path segment, and the midpoint of the flight path segment between the current aircraft location and the end of the flight path segment are each within the threshold distance or flight time of a potential diversion airport before including that particular potential diversion airport for further analysis.

In one or more embodiments, the threshold distance, flight time, or other filtering criteria are dynamically calculated or otherwise determined in real-time based on the current amount of fuel remaining onboard the aircraft, the current aircraft altitude, the current aircraft velocity, and the like, as well as accounting for current status information along the remainder of the flight path segment (e.g., meteorological conditions along the route, and the like). In this regard, the subset of potential diversion destinations to be analyzed with respect to the remainder of the current flight path segment ahead of the current aircraft location may be different from those that were included initially when the selection process 200 was performed on the ground due to changes that have occurred during flight, such that current status information associated with the aircraft 102 and/or the route is different from what was initially anticipated or expected prior to the aircraft 102 reaching or traversing the current segment, in conjunction with a reduced portion of the current flight path segment being considered due to preceding portions of the flight path segment having already been traversed by the aircraft 102.

After identifying the subset of airports to be analyzed with respect to the remainder of the current flight path segment, the diversion display process 400 receives or otherwise obtains current status information pertaining to the remaining airports to be analyzed, as well as potentially receiving or obtaining current status information pertaining to routes between the remainder of the flight path segment and any one or more of the airports being analyzed. The current status information pertaining to the airports generally represents the instantaneous, real-time or most recent available information that quantifies the current operations at the respective airports within the subset of potential diversion airports to be analyzed with respect to the current flight path segment. The current airport status information associated with a particular airport provides one or more base parameters for scoring or otherwise grading the viability of that airport with respect to one or more parameter groups, as described in greater detail below. For example, the processing system 108 may obtain, for each airport, one or more of the following: the current meteorological conditions at or near the airport, the current operational status of the runways and/or taxiways at the airport, the current air traffic conditions for the airport, any current auxiliary reports applicable to the airport (e.g., NOTAMs, PIREPs, SIGMETs, and the like), any current airspace restrictions, current meteorological forecast information for the geographic area encompassing the airport, and the like. Based on the current location of the aircraft 102, locations along the remainder of the flight path segment, and the respective locations of the airports being analyzed, the processing system 108 may also obtain current status information for potential routes from the current flight path segment to a particular airport, which also provides one or more base parameters for scoring or otherwise grading the viability of that airport with respect to one or more parameter groups, as described in greater detail below.

After identifying the subset of airports to be analyzed, the diversion display process 400 continues by ranking, prioritizing, or otherwise ordering the airports within the subset of airports relevant to the remainder flight path segment in terms of their relative viabilities with respect to the aircraft based on the current aircraft status information, the current airport status information, and the current route status information. In this regard, the potential diversion airports are scored and then ordered in terms of relative viability.

Thereafter, the diversion display process 400 continues by generating or otherwise providing graphical indication of the recommended diversion airport for the remainder of the current flight path segment (task 412). In some embodiments where a previously selected diversion airport is also the highest ranked or recommended diversion airport, the diversion display process 400 may display symbology on a navigational map for that airport along with additional graphical indicia (e.g., indicia 325) that notifies the pilot that the selected diversion airport for the current flight path segment is the recommended or optimal diversion airport. In some embodiments, in the absence of a previously selected diversion airport, the diversion display process 400 may similarly display symbology on a navigational map for that airport to notify the pilot of the recommended diversion airport, either with or without additional graphical indicia.

In one or more embodiments, when the previously selected diversion airport for the current flight path segment is not the highest ranked or recommended diversion airport for the remainder of the flight path segment, the diversion display process 400 may concurrently display symbology corresponding to the recommended diversion airport along with symbology for the selected diversion airport on the navigational map, with the symbology for the recommended diversion airport being rendered with a visually distinguishable characteristic or other graphical indicia that notifies the pilot of the existence of a potentially preferable diversion airport other than the selected diversion airport for the remainder of the current flight path segment. In one or more embodiments, the airport symbologies also provide graphical indicia of the parameter group states for both the recommended and selected diversion airports when displayed concurrently, thereby allowing the pilot to quickly ascertain any relative differences between the two airports. Additionally, one or more GUI elements may be provided on the navigational map display that are configured to allow the pilot or other user to modify the diversion airport associated with the current flight path segment, for example, by selecting the newly recommended diversion airport in lieu of the previously selected diversion airport for the segment. For example, in a similar manner as described above in the context of FIG. 3, a drop box or other GUI element (e.g., GUI element 330) may be presented that allows the pilot to drag and drop, select, or otherwise input the newly recommended diversion airport, and thereby modify the diversion airport associated with the current flight path segment. In response to identifying selection of the recommended diversion airport for the current flight path segment, the processing system 108 may automatically update the flight plan data maintained in the data storage element 124 to associate that airport with the current flight path segment.

The diversion display process 400 may periodically repeat to dynamically update the navigational map display to indicate the highest ranked diversion airport for the current flight path segment in real-time to reflect ongoing changes to aircraft status information, airport status information, route status information, and the like. Thus, when a selected or previously indicated diversion airport is believed to be suboptimal, the pilot may be apprised of a potentially better available option, which, in turn, increases the pilot's situational awareness as well as improving the likelihood of successful operation of the aircraft 102 in the event of a diversion while flying the current flight path segment. Once the aircraft 102 traverses to the end of the current flight path segment or comes within a threshold distance or flight time of reaching the end of the segment based on the current aircraft status information, the diversion display process 400 is repeated for the next flight path segment of the flight plan until the aircraft 102 arrives at the final destination.

Figure 5:
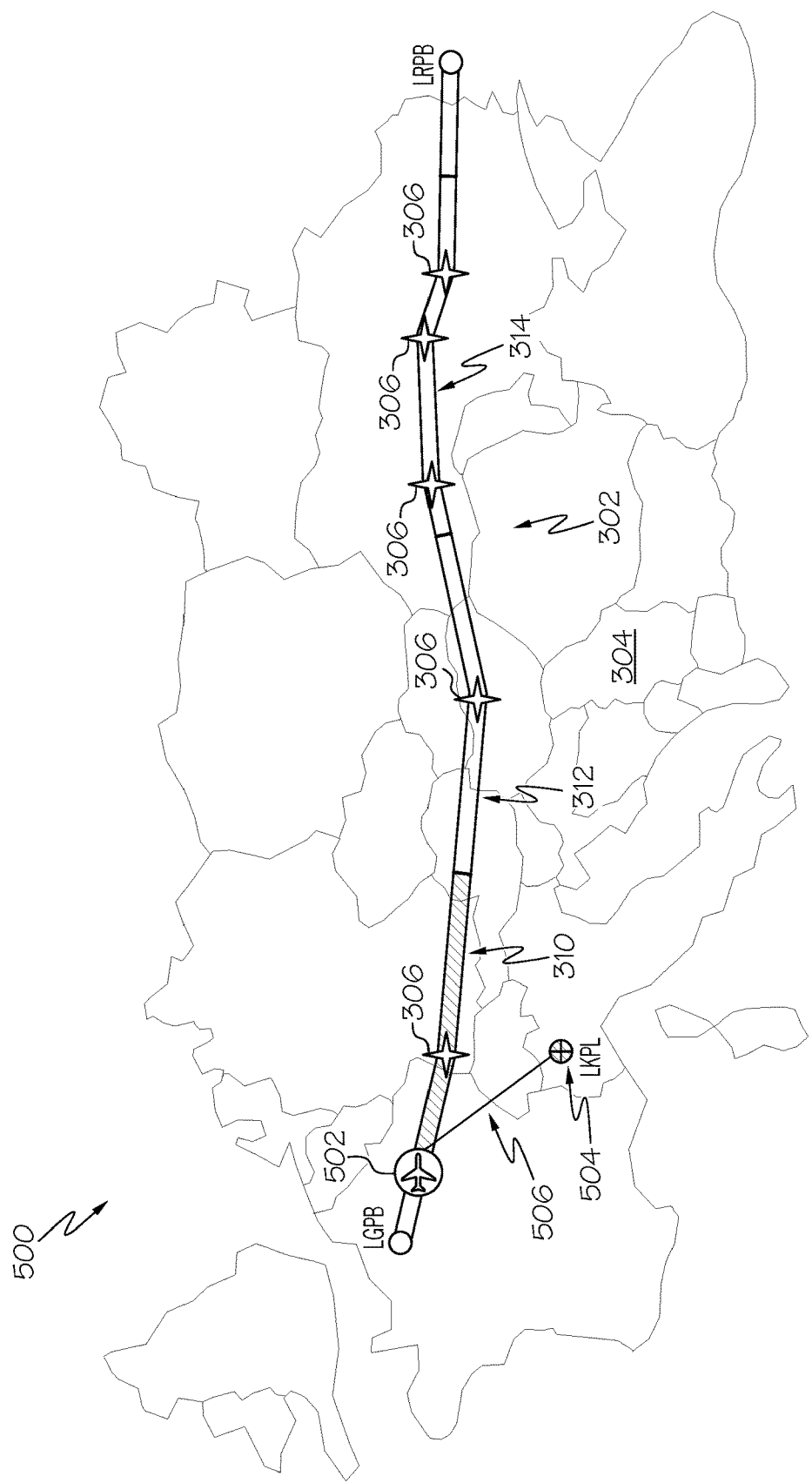
FIGS. 5-6 depict exemplary navigational map displays suitable for display on a display device associated with the aircraft in the system of FIG. 1 in accordance with one or more embodiments of the en route diversion display process of FIG. 4.
Figure 6:
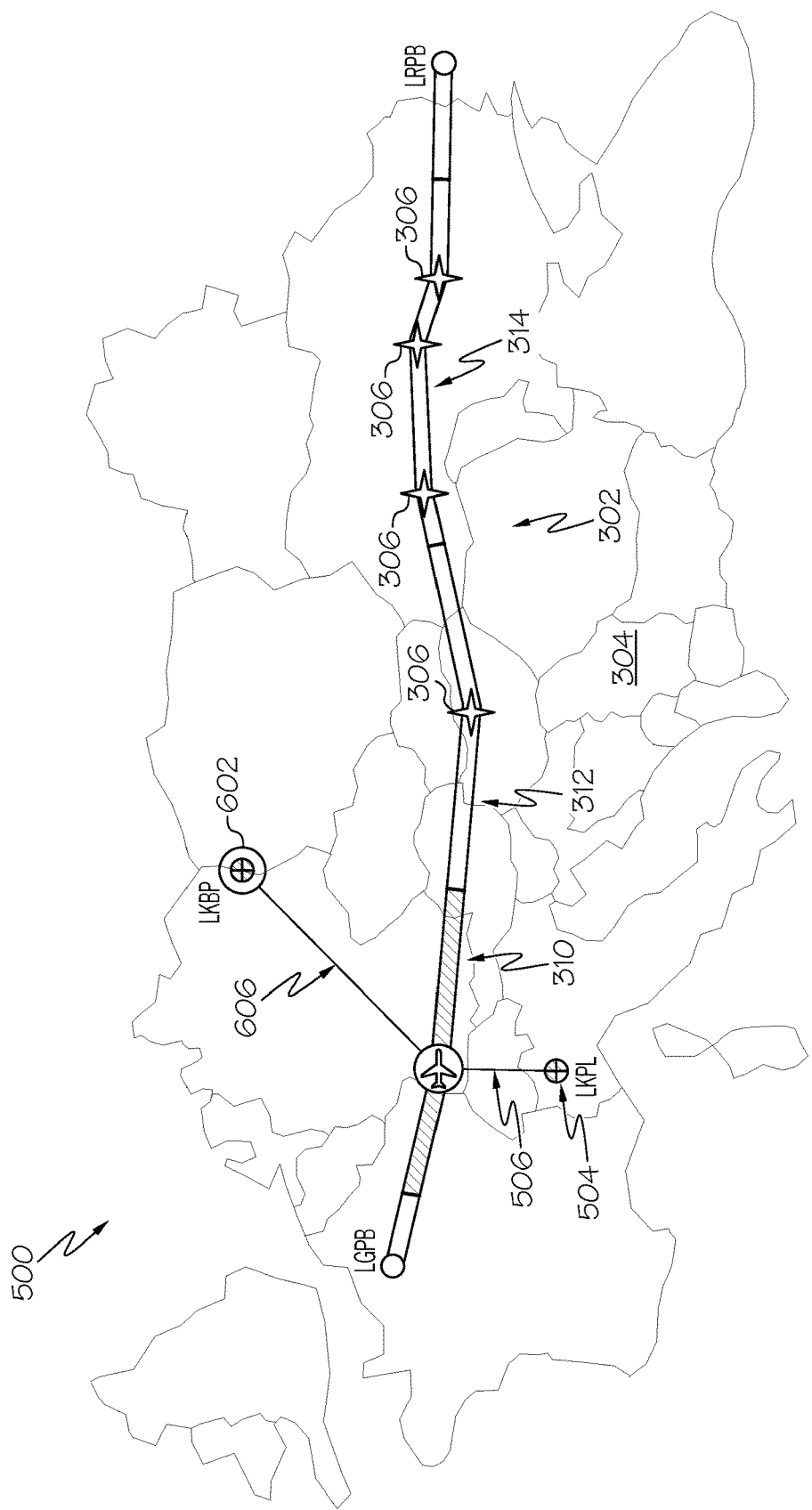

FIGS. 5-6 depict an exemplary sequence of navigational map displays 500 that may be displayed, rendered, or otherwise presented on the display device 104 in conjunction with the diversion display process 400 of FIG. 4 during flight. The navigational map 500 includes a graphical representation 302 of the flight plan overlaid or rendered on top of a background 304, along with a graphical representation 502 of the aircraft 102 overlaid or rendered on top of a background 304. In an exemplary embodiment, the navigational map 500 is associated with the movement of the aircraft 102, and the aircraft symbology 502 refreshes or otherwise updates as the aircraft 102 travels, such that the graphical representation of the aircraft 502 is positioned over the terrain background 304 in a manner that accurately reflects the current (e.g., instantaneous or substantially real-time) real-world positioning of the aircraft 102 relative to the earth. The illustrated map 500 is centered on the flight plan 302, where the aircraft symbology 502 is shown as traveling across the navigational map 300 (e.g., by updating the location of the aircraft symbology 502 with respect to the background 304), while in other embodiments, the aircraft symbology 502 may be located at a fixed position on the navigational map 500 (e.g., by updating the background 304 and positioning of the flight plan 302 with respect to the aircraft graphic 502 such that the map 500 is maintained centered on and/or aligned with the aircraft graphic 502). While the illustrated navigational map 500 is oriented in a cardinal direction, alternatively, the orientation of the navigational map 500 may be track-up or heading-up (i.e., aligned such that the aircraft symbology 502 is always traveling in an upward direction and the background 304 adjusted accordingly).

Referring to FIGS. 4-5, in response to obtaining the current location of the aircraft 102, 502, the processing system 108 identifies flight path segment 310 as the current flight path segment (e.g., tasks 402, 404) and graphically indicates or otherwise highlights the flight path segment 310 as the active flight path segment 310 for which one or more diversion airport(s) are being displayed. As described above, the processing system 108 identifies a subset of potential diversion airports satisfying one or more filtering criteria with respect to the remaining portion of the flight path segment 310 between the current location of the aircraft 102, 502 and the end of the flight path segment 310 (e.g., the boundary with segment 312), and then analyzes and ranks the relative viability of those airports with respect to the remaining portion of the flight path segment 310 (e.g., tasks 406, 408, 410). In the illustrated embodiment, airport LKPL is identified as the highest ranked or recommended diversion airport for the current flight path segment 310, and accordingly, the processing system 108 provides a graphical indication to the pilot, for example, by displaying symbology 504 representative of airport LKPL on the map 500 at the appropriate geographic location. For example, compared to the example presented in FIG. 3, during subsequent execution of the flight plan 302 at the time the aircraft 102 reaches the starting point of the initial flight path segment 310, airport LKPL may be more highly recommended than airport LKBP based on current status information deviating from what was initially forecasted or anticipated on the ground.

Still referring to FIG. 5, in exemplary embodiments, the processing system 108 also generates or otherwise provides a graphical element 506 that indicates the route from the current location of the aircraft 102, 502 to the recommended diversion airport 504, such as a line segment, arrow, pointer, or the like. Although not illustrated, in some embodiments, textual information may also be presented along the graphical element 506 or otherwise in graphical association with the graphical element 506, and such textual information associated with the graphical element 506 may include, for example, the bearing (or heading) for reaching the recommended diversion airport 504 from the current aircraft location, the distance between the current aircraft location and the recommended diversion airport 504, one or more meteorological conditions associated with the route to the recommended diversion airport 504 (e.g., the wind speed), or the like.

Referring now to FIG. 6, and with reference to FIGS. 4-5, in exemplary embodiments, the diversion display process 400 is periodically performed to update the navigational map 500 as the aircraft 102, 502 travels along the current flight path segment 310. In this regard, in response to obtaining new or updated status information (e.g., task 402), the graphical representation of the aircraft 502 is updated to maintain correspondence between the location of the aircraft graphic 502 with respect to the terrain background 304 and/or flight plan 302 and the real-world geographic location of the aircraft 102. The diversion display process 400 then repeats the tasks of identifying flight path segment to be analyzed, identifying a subset of potential diversion airports satisfying one or more filtering criteria with respect to the remaining portion of the identified flight path segment, and then analyzing and ranking the relative viability of those airports with respect to the remaining portion of the flight path segment (e.g., tasks 404, 406, 408, 410). In this regard, the illustrated embodiment corresponds to a scenario where the highest ranked or recommended diversion airport for the remainder of the current flight path segment 310 is different from the previously selected diversion airport for the current flight path segment 310. For example, based on changes to the status information associated with the aircraft, the potential diversion airports, the potential routes, or the like along with changes to the length of the remaining portion of the flight path segment 310 being analyzed, airport LKBP may subsequently be more highly ranked than airport LKPL with respect to the remaining portion of the current flight path segment 310 between the updated aircraft location and the end of the flight path segment 310.

In the illustrated embodiment, airport LKBP is identified as the new highest ranked or recommended diversion airport for the current flight path segment 310. For example, symbology 602 representative of airport LKBP may be displayed on the map 500 at the appropriate geographic location concurrently to displaying symbology 504 representative of the previously selected LKPL diversion airport, but with the newly recommended symbology 602 being rendered using one or more visually distinguishable characteristics different from symbology 504. In this regard, the symbology 602 representative of a newly recommended but unselected diversion airport may be rendered with a transparency, fading, or other characteristic that deemphasizes the symbology 602 in a manner that indicates that the symbology 602 is not currently active or selected. That said, the symbology 602 may concurrently include one or more graphical indicia 625 indicating that the depicted airport is recommended without being selected or active. Additionally, in exemplary embodiments, the processing system 108 also generates or otherwise provides a graphical element 606 and associated textual information that indicates and characterizes the route from the current location of the aircraft 102, 502 to the recommended diversion airport 602.

In one or more embodiments, when multiple airport symbologies 504, 602 are presented on the map 500, the airport symbologies 504, 602 include graphical indicia representative of the parameter group viability states for the displayed airports 504, 602, thereby allowing the pilot to quickly ascertain the relative viability of the airports 504, 602 and make a more informed decision regarding which airport 504, 602 should be designated for use going forward. For example, in the illustrated embodiment of FIG. 6, the LKPL symbology 504 indicates one of the parameter groups associated with the LKPL airport does not have the highest viability level, whereas all of the parameter groups associated with the LKBP airport have the highest viability level. Thus, a pilot can quickly ascertain the relative deficiencies (if any) of the previously selected diversion airport with respect to the newly recommended diversion airport.

In response to identifying subsequent selection of the recommended diversion airport symbology 602 for use as the new diversion airport for the remainder of the current flight path segment 310, the processing system 108 may automatically update the flight plan data maintained in the data storage element 124 to associate the LKBP airport with the current flight path segment 310 in the event of a subsequent diversion. Additionally, in response to selection of the newly recommended LKBP airport for use instead of the LKPL airport, the LKBP airport symbology 602 may be updated and displayed using visually distinguishing characteristics indicating it is active and selected (e.g., by increasing transparency, reducing fading, etc.) and removing the LKPL airport symbology 504 from the navigational map 500.

Diversion Airport Prioritization

Figure 7:
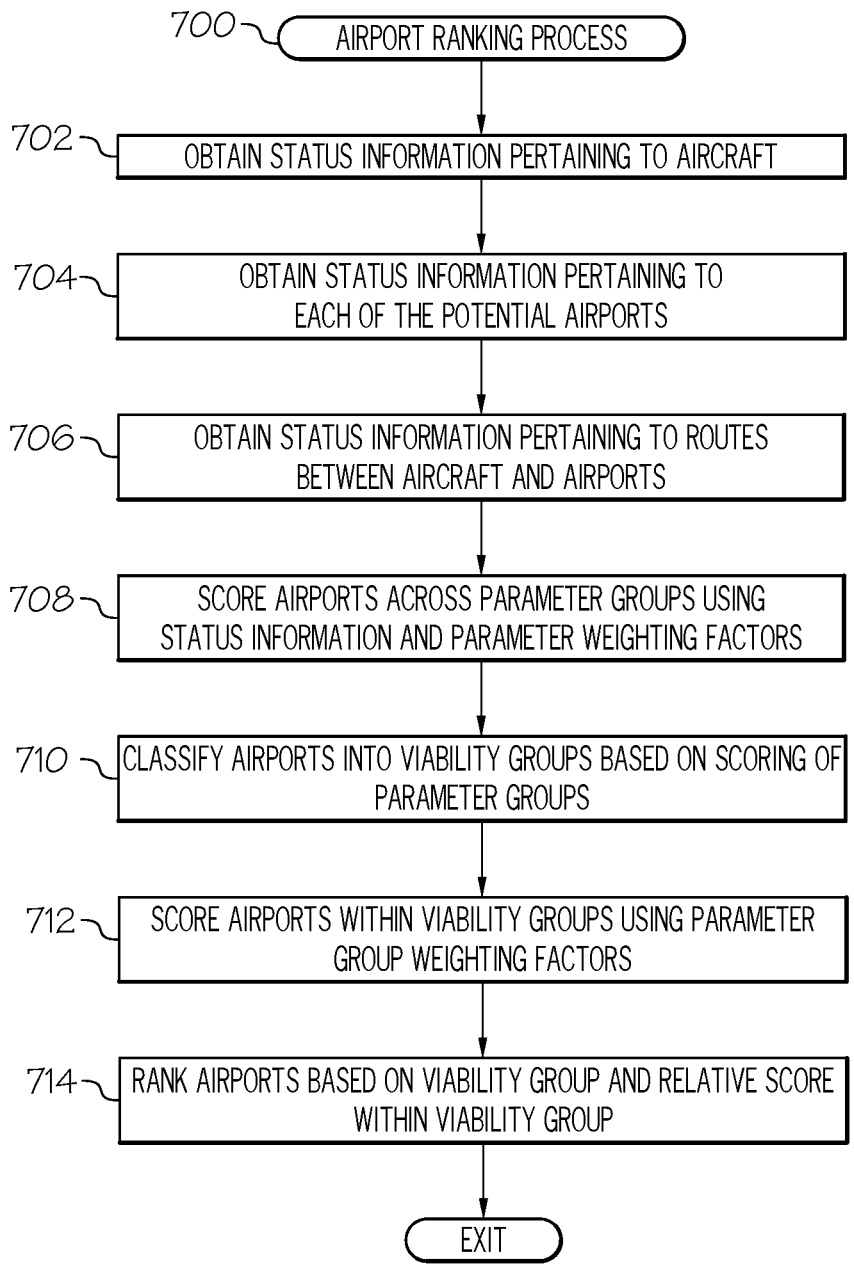
FIG. 7 is a flow diagram of an exemplary airport ranking process suitable for use with the route diversion selection process of FIG. 2 or the en route diversion display process of FIG. 4 in accordance with one or more embodiments.

Referring now to FIG. 7, in one exemplary embodiment, an airport ranking process 700 is performed in conjunction with the processes 200, 400 of FIGS. 2 and 4 to rank airports. The various tasks performed in connection with the illustrated process 700 may be implemented using hardware, firmware, software executed by processing circuitry, or any combination thereof. For illustrative purposes, the following description may refer to elements mentioned above in connection with FIG. 1. In practice, portions of the airport ranking process 700 may be performed by different elements of the system 100; however, for purposes of explanation, the airport ranking process 700 may be described herein primarily in the context of being performed by the processing system 108. Again, it should be appreciated that the airport ranking process 700 may include any number of additional or alternative tasks, may not be performed in the illustrated order, one or more of the tasks may be performed concurrently or omitted, and/or the airport ranking process 700 may be incorporated into a more comprehensive procedure or process having additional functionality not described in detail herein.

Referring to FIG. 7, and with continued reference to FIGS. 1-6, in exemplary embodiments, the airport ranking process 700 is performed whenever potential diversion airports are to be analyzed with respect to a particular flight path segment. The airport ranking process 700 receives or otherwise obtains current or anticipated status information pertaining to the aircraft operation along the flight path segment of interest (task 702). In this regard, current aircraft status information may be utilized while en route and the aircraft is flying the segment of interest (e.g., during iterations of diversion display process 400) while anticipated aircraft status information is utilized for segments yet to be flown by the aircraft 102 (e.g., during iterations of the route diversion selection process 200). The aircraft status information provides one or more base parameters for scoring or otherwise grading the viability of an airport with respect to one or more parameter groups, as described in greater detail below.

Additionally, the airport ranking process 700 receives or otherwise obtains current or anticipated status information pertaining to the potential diversion airports to be analyzed (task 704). The airport status information quantifies the current or anticipated operations at the respective airports satisfying filtering criteria with respect to the flight path segment being analyzed by the respective process 200, 400. The airport status information associated with a particular airport provides one or more base parameters for scoring or otherwise grading the viability of that airport with respect to one or more parameter groups, as described in greater detail below. For example, the processing system 108 may obtain, for each airport, one or more of the following: the meteorological conditions at or near the airport, the operational status of the runways and/or taxiways at the airport, the air traffic conditions for the airport, any auxiliary reports applicable to the airport (e.g., NOTAMs, PIREPs, SIGMETs, and the like), any airspace restrictions, meteorological forecast information for the geographic area encompassing the airport, and the like.

The illustrated embodiment of the airport ranking process 700 also receives or otherwise obtains current or anticipated status information pertaining to routes between the current or anticipated location(s) of the aircraft along the flight path segment and any one or more of the airports being analyzed (task 706). In this regard, based on the geographic information defining the flight path segment and the respective locations of the airports being analyzed, the processing system 108 may identify or otherwise determine the waypoints or other intervening navigational reference points between locations along the flight path segment and a respective airport location that could be utilized to navigate to that airport location, or could otherwise be utilized to assess navigation to that airport location. In a similar manner, the processing system 108 then obtains, for each of the identified intervening navigational reference points, one or more of the following: the meteorological conditions at or near the navigational reference point, meteorological forecast information for the geographic area encompassing the navigational reference point, any auxiliary reports for a geographic area encompassing the navigational reference point, and the like. The status information associated with a particular navigational reference point or route to/from a particular airport provides one or more base parameters for scoring or otherwise grading the viability of that airport with respect to one or more parameter groups, as described in greater detail below.

After obtaining status information relevant to the aircraft and the airports to be analyzed, the airport ranking process 700 scores or otherwise grades each of the airports across a plurality of different parameter groups using the current status information pertaining to the respective airport and any applicable parameter weighting factors (task 708). As described in greater detail below in the context of FIG. 8, for each airport, status parameters associated with the aircraft and the airport, along with any available status parameters associated with the route from the current aircraft location to the airport location, are classified or categorize into one of a plurality of parameter groups. In this regard, each parameter group generally represents a consolidation or integration of parameters that quantify a particular aspect of viably accessing or landing at an airport. For example, in the illustrated embodiment of FIG. 3, the parameter groups correspond to Aircraft Performance (e.g., parameters quantifying the ability of the aircraft to perform a landing at the airport), Airport Availability (e.g., parameters quantifying the ability of the airport to accommodate the aircraft), Weather (e.g., parameters quantifying potential meteorological impacts on traveling to and/or landing at the airport), and Airline Constraints (e.g., parameters quantifying other criteria or preferences pertaining to use of the airport). As another example embodiment, the parameters may be classified into one of the following groupings: an airport accessibility parameter group (e.g., en route weather, aircraft performance, fuel criteria, airspace restrictions, etc.), an airport availability parameter group (e.g., runway status, weather at the airport, air traffic at the airport, and the like), an aircraft configuration parameter group (e.g., type of aircraft, configurations or operating conditions of mechanical components, or the like), and an airline preferences parameter group (e.g., based on airline contracts with the airport, ground services at the airport, number of passengers onboard the aircraft, and the like). It should be noted that any number or type of parameter groups may be utilized to organize parameters influencing viability of landing at an airport, however, from a human factors perspective, consolidating the parameters into a relatively small number of parameter groups facilitates more expedient analysis by an aircraft operator. In this regard, fewer than four parameter groups could be utilized in some embodiments.

In addition to classifying the base parameters into parameter groups, exemplary embodiments also calculate or otherwise determine complex parameters derived based at least in part on one or more base parameters. For example, a runway viability parameter may be calculated for an active runway at a particular airport of interest based on the length of the runway, the current meteorological conditions at the airport, the current weight of the aircraft, and other parameters influencing the braking performance of the aircraft. In this regard, the processing system 108 may calculate the length required to stop the aircraft 102 based on the anticipated aircraft weight at the estimated time of arrival for the airport, the landing speed for the aircraft, and the anticipated surface conditions of the runway based on the current meteorological conditions at the airport. From there, the processing system 108 may determine a runway viability parameter value that quantifies the difference between the length required to stop the aircraft 102 and the runway length. The runway viability parameter value may then be classified into the appropriate parameter group for a given embodiment (e.g., Airport Availability). Again, it should be noted that any number or type of complex parameters may be calculated and classified into the appropriate parameter group.

Once the base and complex parameters for an airport are classified into the appropriate parameter groups, the processing system 108 determines a cumulative parameter group viability state and a cumulative parameter group viability score for each parameter group. In this regard, the cumulative parameter group viability score is determined based on the constituent parameters classified into that parameter group, with the cumulative parameter group viability state being dictated by a binary parameter classified into the parameter group or the parameter group viability score, as described in greater detail below in the context of FIG. 8. Depending on the embodiment, the parameter group viability score may be calculated as a weighted combination of the constituent parameters, applying fuzzy logic to the constituent parameters, or a combination thereof. The parameter group viability states and scores for each airport are maintained in association with the airport.

After scoring the airports, the airport ranking process 700 classifies the airports into viability groups based on the scoring (task 710). In exemplary embodiments, the processing system 108 classifies the airports based on their respective parameter group viability states across all of the parameter groups, as described above. For example, airports having the highest parameter group viability state for each of the parameter groups may be classified into the highest viability airport grouping, airports having the lowest parameter group viability state for at least one of the parameter groups may be classified into the lowest viability airport grouping, with the remaining airports being classified into an intermediate viability airport grouping.

In the illustrated embodiment, the airport ranking process 700 scores or otherwise grades each of the airports based on their respective parameter group scores and then ranks each of the airports within their respective viability groups based on that scoring relative to others in that group (tasks 712, 714). In an exemplary embodiment, for each airport classified in the highest viability airport grouping, a cumulative viability score is calculated as a weighted combination of the individual parameter group scores associated with the airport. In this regard, weighting factors may be assigned by an airline operator, the pilot, or another individual to increase the influence of a particular parameter group score relative to the other parameter groups. For example, the viability score for the aircraft performance parameter group may be weighted more heavily than the airport availability parameter group viability score and the weather parameter group viability score, with the airline constraint parameter group viability score being weighted to have the least influence on the cumulative viability score. For other airport groupings, fuzzy logic and weighting factors may be applied to determine a cumulative viability score for each airport as some combination of its associated parameter group viability scores and its associated parameter group viability states other than those having the highest parameter group viability state. Within each grouping, the constituent airports are then sorted, ranked, or otherwise ordered based on their cumulative viability scores from most viable to least viable. In this manner, the airports are ranked primarily by viability groupings, and secondarily based on their cumulative viability scores relative to other airports within a particular viability grouping.

Figure 8:
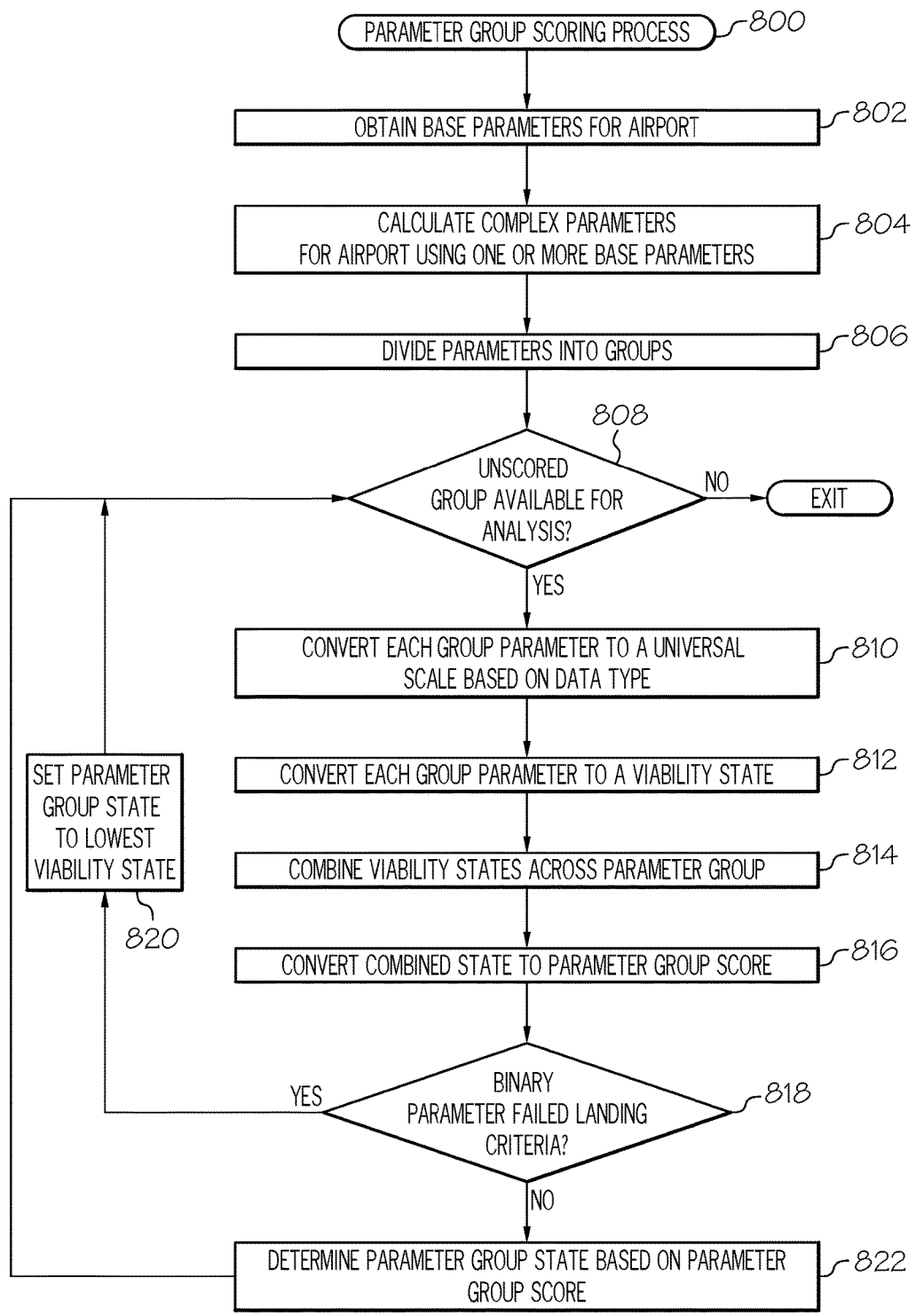
FIG. 8 is a flow diagram of an exemplary parameter group scoring process suitable for use with the airport ranking process of FIG. 7 in conjunction with the route diversion selection process of FIG. 2 or the en route diversion display process of FIG. 4 in accordance with one or more embodiments.

Referring now to FIG. 8, in one exemplary embodiment, a parameter group scoring process 800 is performed in conjunction with the airport ranking process 700 of FIG. 7 to score an airport across a plurality of parameter groups (e.g., task 708). The various tasks performed in connection with the illustrated process 800 may be implemented using hardware, firmware, software executed by processing circuitry, or any combination thereof. For illustrative purposes, the following description may refer to elements mentioned above in connection with FIG. 1. In practice, portions of the scoring process 800 may be performed by different elements of the system 100; however, for purposes of explanation, the scoring process 800 may be described herein primarily in the context of being performed by the processing system 108. Again, it should be appreciated that the scoring process 800 may include any number of additional or alternative tasks, may not be performed in the illustrated order, one or more of the tasks may be performed concurrently or omitted, and/or the scoring process 800 may be incorporated into a more comprehensive procedure or process having additional functionality not described in detail herein.

The scoring process 800 may be performed any number of times in connection with the airport ranking process 700, with each iteration of the scoring process 800 corresponding to an individual airport being analyzed for purposes of presentation in an intelligently ordered diversion list. In this regard, the scoring process 800 begins by receiving, obtaining, or otherwise identifying the base parameters pertinent to landing at the airport currently being analyzed, calculating or otherwise determining one or more complex parameters associated with the airport using one or more of the base parameters, and then dividing, categorizing, or otherwise classifying the base and complex parameters into their corresponding parameter groups (task 802, 804, 806). In this regard, the processing system 108 obtains base parameters characterizing or quantifying the current or anticipated state of the aircraft 102, the current or anticipated state of the airport being analyzed, and any current or anticipated status base parameters capable of characterizing or quantifying an anticipated route of travel between the flight path segment and the airport (e.g., tasks 702, 704, 706). Thereafter, the processing system 108 calculates any complex parameters that can be derived from the available base parameters to further quantify or characterize the potential viability of landing at the airport. For example, as described above, a runway viability parameter for the airport may be calculated based on the length of an active runway at the airport (e.g., based on current status information for the airport indicating the runway is available for use), the current meteorological conditions at the airport, the current weight of the aircraft 102, and other parameters influencing the braking performance of the aircraft 102. As another example, calculation of aircraft range in the direction of a potential destination may entail calculating fuel consumption requirements based on the following base parameters: available fuel, route to destination (either direct or indirect depending on circumstances), meteorological parameters (e.g., tailwind component and the like), aircraft performance parameters (e.g., engine status and the like), which, in turn, may yield the maximum range towards the destination and fuel remaining at destination as two complex parameters. Additionally, the calculated amount of fuel remaining may be utilized to calculate other complex parameters, such as the aircraft weight at the destination, which may further be compared to maximum landing weight or other landing viability criteria for the particular destination. Thereafter, the base and complex parameters are assigned to or otherwise associated with a particular parameter group (e.g., an accessibility group, an availability parameter group, a meteorological parameter group, a preferences parameter group, or the like).

After the parameters for a particular airport have been classified into groups, the scoring process 800 proceeds by determining a viability state and score for each of the parameter groups (task 808). The scoring process 800 first normalizes or otherwise converts each parameter within a parameter group to a common or universal scale to facilitate combining the parameters (task 810). In this regard, based upon the particular data type associated with each parameter, its value is converted to a numerical representation on a scale in common with the other parameters in the group. For example, in one embodiment, three different parameter data types are supported (e.g., binary, continuous, and discrete), and each parameter is normalized to a scale from 0 to 1, with 0 representing the lowest possible viability and 1 representing the highest possible viability. In such an embodiment, any parameters having a binary data type (e.g., where one potential value is viable and the other potential value(s) are not viable) associated therewith are then classified as either 0 or 1. Any parameters having a continuous data type are scaled to a value between 0 and 1, for example, by converting the parameter value to a ratio of the potential range of the continuous parameter (e.g., by dividing the parameter value by a maximum value for the parameter). Any parameters having a continuous data type are scaled to a value between 0 and 1, for example, by converting the parameter value to a ratio of the potential range of the continuous parameter (e.g., by dividing the parameter value by a maximum value for the parameter). Lastly, any parameters having a discrete data type are converted to a corresponding value between 0 and 1, for example, by using advance knowledge or expert judgment to assign a viability value between 0 and 1 to each potential discrete state for that parameter. For example, a runway surface condition parameter (which may be a complex parameter determined based on current or forecasted meteorological information for the airport location) may be quantified as follows: a clear or non-impacted surface condition state assigned a value of 1.0, a wet surface condition state assigned a value of 0.6, a snowy surface condition state assigned a value of 0.3, and an icy surface condition state assigned a value of 0.1.

Once the parameters of the group are on the same scale, exemplary embodiments of the scoring process 800 converts the value of each parameter to a corresponding viability state representation, combines the viability state representations of all the parameters of the group, and then converts that combined result to a corresponding parameter group score (tasks 812, 814, 816). Fuzzy logic or a fuzzy regulator may be employed to convert the normalized parameter values into discrete viability states and then calculate the parameter group score as a weighted combination of the viability states (e.g., by multiplying or otherwise scaling the influence of each particular parameter using an associated parameter weighting factor). For example, each viability state may be represented by a state function placed at the normative value of the state (e.g. intermediate state placed at 0.5 with a triangular function showing pertinence to the state). The state functions for various states may overlap. A normalized value of a parameter is then represented by a sum of one or more state functions multiplied with respective relevance. The sum can then be weighted or scaled to adjust the influence of the parameter on the viability score. In this regard, the pilot, airline operator, or other user may tune the parameter group scoring in a desired manner to weight some parameters more heavily than others (otherwise, weighting factors for each parameter may be defaulted to the same value or unused). State functions of all parameters are then summed into the combined viability state. The combined viability state resulting from the weighted combination of individual parameter viability states is then converted to a corresponding parameter group score by defuzzification, for example, by taking the center of gravity (COG) of the combined viability state on a [0,1] interval. The position of the center of gravity then dictates one or more viability states with respective pertinence, and the most pertinent viability state is used as the parameter group score. The parameter group score is then stored or otherwise maintained in association with the airport and thereby numerically quantifies or characterizes the relative viability of that aspect of landing at the airport (e.g., accessibility, availability, or the like).

The scoring process 800 also assigns or otherwise designates a viability state to each parameter group. In this regard, in the event the parameter group includes a binary parameter having a value (e.g., 0) that fails to satisfy an applicable criterion for landing the aircraft at an airport, the scoring process 800 automatically assigns or otherwise sets the parameter group state to the lowest viability state regardless of the parameter group score (tasks 818, 820). Conversely, when the parameter group does not include any binary parameters that fail applicable landing criteria, the scoring process 800 determines the parameter group viability state based on the parameter group score (task 822), for example, by using fuzzy logic or a fuzzy regulator in a similar manner as described above (e.g., task 816) to correlate the parameter group score to a viability state. The parameter group viability state and group viability score are also stored or otherwise maintained in association with the airport to quantify or characterize that aspect of landing at the airport in a discrete manner.

The loop defined by tasks 808, 810, 812, 814, 816, 818, 820 and 822 repeats for every parameter group associated with a particular airport. Thereafter, the parameter group viability states determined by the scoring process 800 and associated with that particular airport are then utilized to classify or otherwise order that airport into a particular viability grouping (e.g., task 710), with the parameter group scores determined by the scoring process 800 and associated with that particular airport being utilized to determine a cumulative viability score and rank or otherwise order that airport within its viability grouping (e.g., tasks 712, 714). In this manner, the parameter group viability states are used to discretely categorize and order the airports at a relatively coarse granularity, and the parameter group viability scores are used to further order the airports with finer granularity. As a result, the task of resolving the particular nuances that may make one airport a better diversion destination than another airport having an identical viability state is offloaded from the pilot or other user.

By virtue of the subject matter described above, the pilot or other vehicle operator can quickly ascertain the current (or real-time) qualitative viability of potential diversion destinations with respect to a particular discrete segment of travel, as well as the qualitative viability relative to other potential diversion destinations. Thus, the tasks of mentally or manually aggregating information for each individual destination (as well as the route thereto) from a variety of sources, determining any complex parameters for each individual destination, determining whether each individual destination satisfies any particular preferences, contractual agreements, or other ancillary requirements, and then assessing the relative viability or fitness of a particular destination with respect to the length of the segment of travel and relative to all of the other potential options is largely offloaded from the pilot or vehicle operator. Accordingly, the mental workload and stress is reduced (which helps to reduce any operator error), situational awareness is improved, and the time required to select an optimal diversion destination for a travel segment can be reduced.

Automated Route Segmentation

Referring now to FIG. 9, in an exemplary embodiment, the system 100 is configured to support a flight plan segmentation process 900 and perform additional tasks, functions, and operations described below. The various tasks performed in connection with the illustrated process 900 may be implemented using hardware, firmware, software executed by processing circuitry, or any combination thereof. For illustrative purposes, the following description may refer to elements mentioned above in connection with FIG. 1. In practice, portions of the flight plan segmentation process 900 may be performed by different elements of the system 100, such as, the processing system 108, the display system 110, the communications system 112, the navigation system 114, the FMS 116, the onboard avionics systems 118, the onboard detection systems 120, the data storage element 124 and/or the user input device(s) 106. It should be appreciated that the flight plan segmentation process 900 may include any number of additional or alternative tasks, the tasks need not be performed in the illustrated order and/or the tasks may be performed concurrently, and/or the flight plan segmentation process 900 may be incorporated into a more comprehensive procedure or process having additional functionality not described in detail herein. Moreover, one or more of the tasks shown and described in the context of FIG. 9 could be omitted from a practical embodiment of the flight plan segmentation process 900 as long as the intended overall functionality remains intact.

In one or more exemplary embodiments, the flight plan segmentation process 900 is performed prior to or as part of performance of the route diversion selection process 200 (e.g., task 202 of FIG. 2) to automatically determine segments for which recommended diversion airports could be identified and presented. That said, in other embodiments, the flight plan segmentation process 900 may be performed independently as a standalone process to generate or otherwise provide a representation of how the flight plan could or should be segmented to the pilot or other user for review, manual assignment of diversion airports with respect to the resulting segments, or the like.

The illustrated flight plan segmentation process 900 obtains or otherwise identifies segmentation criteria for subdividing the planned route of travel (task 902). In this regard, the segmentation criteria provides parameters which influence the resulting number of segments after the flight plan is divided. For example, in one embodiment, the segmentation criteria includes a desired number of flight path segments for the flight plan, or a desired range for the resulting number of flight path segments. In other embodiments, the segmentation criteria provides constraints for the length of the flight path segments, either in terms of geographic distance or travel time, which, in turn, influences the number of flight path segments. For example, the pilot or other user may be prompted (e.g., on a display device) manipulate the user input device 106 to input or otherwise provide a minimum flight path segment length and a maximum flight path segment length, which may be stored or otherwise maintained by the processing system 108 in the data storage element 124 in association with the pilot or aircraft 102. In other embodiments, the segmentation criteria may be stored or otherwise maintained by the data storage element 124 in association with a particular pilot, aircraft operator, or the like.

The flight plan segmentation process 900 continues by identifying potential diversion airports within a geographic area encompassing the flight plan and obtaining preference information associated with the potential diversion airports (tasks 904, 906). In this regard, the processing system 108 obtains the navigational reference points that define the flight plan and the departure and arrival locations (e.g., from the FMS 116 and/or the memory 124) and determines a corresponding real-world geographic area that includes or encompasses those locations plus some additional buffer to identify any potential airports within a threshold distance of the route defined by the flight plan. For example, in one embodiment, the processing system 108 identifies any airport within one hundred nautical miles of the departure (or starting) location, the destination (or arrival) location, or any other point along the route defined by the flight plan for inclusion in the set of potential diversion airports for the flight plan. In yet other embodiments, the processing system 108 may identify airports within a threshold travel time from the departure (or starting) location, the destination (or arrival) location, or any other point along the route defined by the flight plan for inclusion in the set of potential diversion airports. In such embodiments, the threshold(s) used to determine a geographic area corresponding to a flight plan may be configured, input, or otherwise provided by the pilot or other user. In yet other embodiments, a geographic area may be determined around the flight path with a size or area that corresponds to an aspect ratio for presenting the flight plan on an onboard display device. Once the set of potential diversion airports within a geographic area encompassing the flight plan is identified, the processing system 108 retrieves or otherwise obtains the preference information associated with those airports from the data storage element 124 for use in weighting particular airports of the set relative to others based on pilot or airline preferences.

In exemplary embodiments, the flight plan segmentation process 900 also receives or otherwise obtains current status information for the potential diversion airport (task 908). The current status information may include current or expected availability or operational information for the potential diversion airports (e.g., available or unavailable runways, terminal services, etc.) along with current or forecasted meteorological information that may impact the availability or preference for a particular airport. In some embodiments, the current status information for a particular airport may be utilized to determine preference information for that airport, for example, in situations where a pilot's preference for a particular airport is conditional and preferred only given certain meteorological conditions, certain active runways, or the like.

Still referring to FIG. 9, the flight plan segmentation process 900 calculates, determines, or otherwise generates an airport density distribution for the geographic area encompassing the flight plan based on the airport preference information and the current status information (task 910). In this regard, the airport density distribution characterizes the number, locations and mutual distance of the potential diversion airports within the geographic area encompassing the flight plan relative to the flight plan in an aggregate or cumulative manner that also accounts for the relative preferences and statuses for the various airports. In other words, airport density distribution may provide a metric correlative to the number of airports per unit area that is also influenced by distances to/from the airports and other preference and/or status information associated with the airports. In one embodiment, using the preference information and the status information for the potential diversion airports, the processing system 108 generates or otherwise determines an airport density distribution as a sum of spread functions for each airport, with each airport's function being weighted according to the relative preference and/or current status. For example, the airport density distribution ($d_{airport}(x,y)$) for the geographic area may be represented by the following equation:

$$d_{airport}(x,y) = \Sigma_a A_a \cdot \text{Gauss}(x-x_a, y-y_a),$$

where a corresponds to a particular potential diversion airport, Aa represents the weighting applied to the particular airport a based on that airport's associated preference information, $x_a$ and $y_a$ represent the coordinate location of the particular airport a, and $\text{Gauss}(x-x_a, y-y_a)$ is a Gaussian spread function for the particular airport a across the geographic area encompassing the flight plan, where x and y are different locations within the geographic area. The variance of the Gaussian spread function is determined by status of airport a combining its size, current suitability or viability and traffic.

Figure 10:
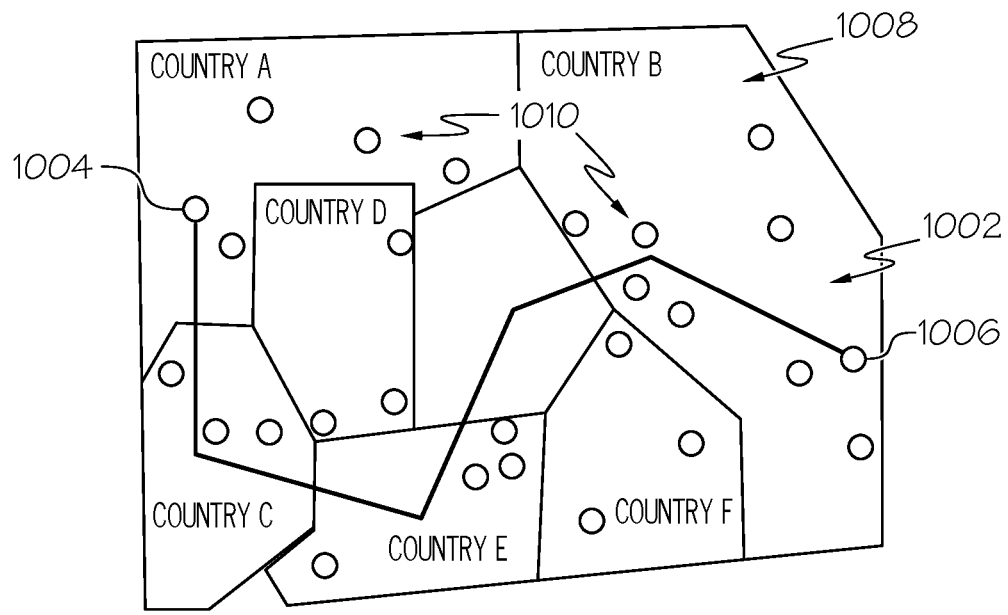
FIGS. 10-13 depict an exemplary sequence of navigational maps illustrating aspects of the flight plan segmentation process of FIG. 9 in one exemplary embodiment.
Figure 11:
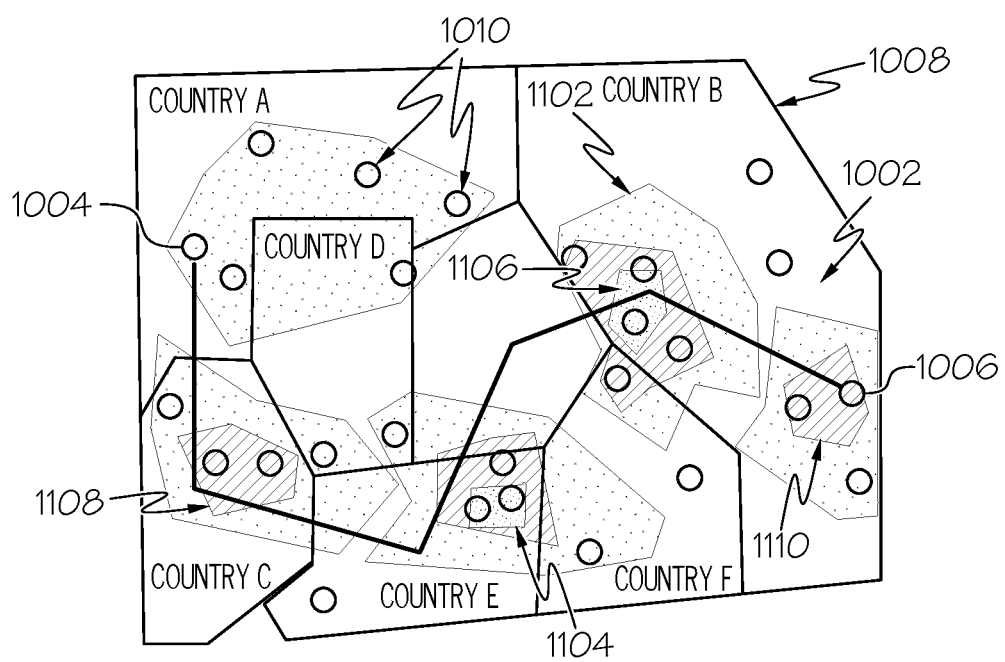

FIGS. 10-11 depict a sequence of navigational maps illustrating an airport density distribution 1102 within a geographic area 1008 encompassing a flight plan 1002 from a departure location 1004 to a destination location 1006. In this regard, FIG. 10 depicts a plurality of potential diversion airports 1010 within the geographic area 1008 at various locations within the geographic area 1008. Based on the airport preference information and the current status information for the potential diversion airports 1010, the airport density distribution 1102 is generated that characterizes the weighted distribution of potential diversion airports within the geographic area 1008 according to preference. In this regard, with reference to FIG. 11, higher density regions 1104, 1106 correspond to geographic regions that are relatively close to a relatively higher concentration of preferred potential diversion airports, while intermediate density regions 1108, 1110 correspond to geographic regions that are relatively close to a lesser concentration of preferred potential diversion airports, while lower or zero density regions correspond to geographic regions having a relatively few (if any) preferred, operable, or available diversion airports.

Referring again to FIG. 9, the flight plan segmentation process 900 also calculates, determines, or otherwise generates an airport morphology density distribution for the geographic area that represents the nominal distance from a particular location within the geographic area to potential diversion airports (task 912). In this regard, the morphology density distribution quantifies or characterizes how isolated a particular location is from potential diversion airports. In one embodiment, the processing system 108 generates or otherwise determines the morphology density distribution as a sum of inverse distances from a particular location within the flight plan geographic area to the potential diversion airports. For example, the morphology density distribution for the geographic area may be represented by the following equation:

$$d_{morphology}(x, y) = \frac{1}{N}\Sigma_a \frac{\exp(-\|x - x_a, y - y_a\|)}{\|x - x_a, y - y_a\|},$$

where N represents the number of potential diversion airports within the geographic area, $x_a$ and $y_a$ represent the coordinate location of the particular airport a, and x and y correspond to the particular location within the flight plan geographic area for which the morphology density distribution is being determined or evaluated.

Figure 12:
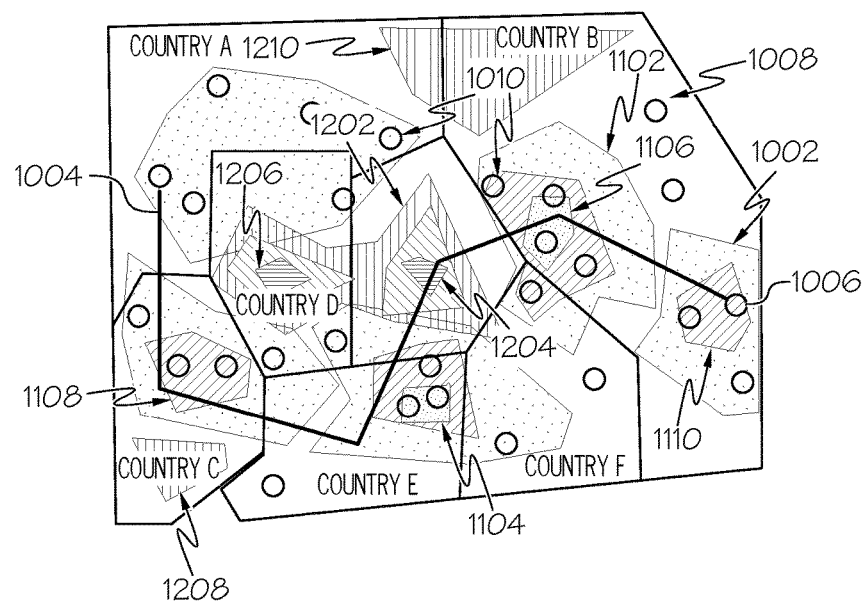

FIG. 12 depicts a navigational map illustrating a morphology density distribution 1202 for the geographic area 1008 overlaid on the flight plan 1002 and geographic area 1008 with the airport density distribution 1102. Higher density regions 1204, 1206 correspond to geographic regions that are relatively far or isolated from potential diversion airports, while intermediate density regions 1208, 1210 correspond to geographic regions that are relatively closer to potential diversion airports.

Referring again to FIG. 9, the flight plan segmentation process 900 also retrieves or otherwise obtains topographic or geographic landing preference information and calculates, determines, or otherwise generates a landing zone density distribution for the geographic area encompassing the flight plan based on the topographic landing preference information and the topographic or geographic features within the geographic area encompassing the flight plan (tasks 914, 916). In this regard, the processing system 108 may access a terrain database 122 or the like to obtain data or information characterizing the topography or geography of the geographic area encompassing the flight plan, access the data storage element 124 to obtain landing preference information for the various topographic or geographic features within the flight plan geographic area, and then determines a topography density distribution that characterizes the preferred landing regions relative to those preferred to be avoided within the flight plan geographic area. In one embodiment, the topography density distribution has a value that ranges from zero to one, where locations having topographic or geographic features that are preferred have a value of one while locations having topographic or geographic features to be avoided have a value of zero. The landing zone density distribution may be represented by the function $d_{topography}(x, y)$, which has a value between zero and one based on the topographic and geographic features at a particular coordinate location as defined in the terrain database and the corresponding landing zone preference weighting for those features. In one or more embodiments, the landing zone density distribution may be the combination of spread functions for the various topographic and geographic features in a similar manner as described above with respect to the airport density distribution, which is then normalized or scaled so that the range of the landing zone density distribution within the geographic area is between zero and one.

Figure 13:
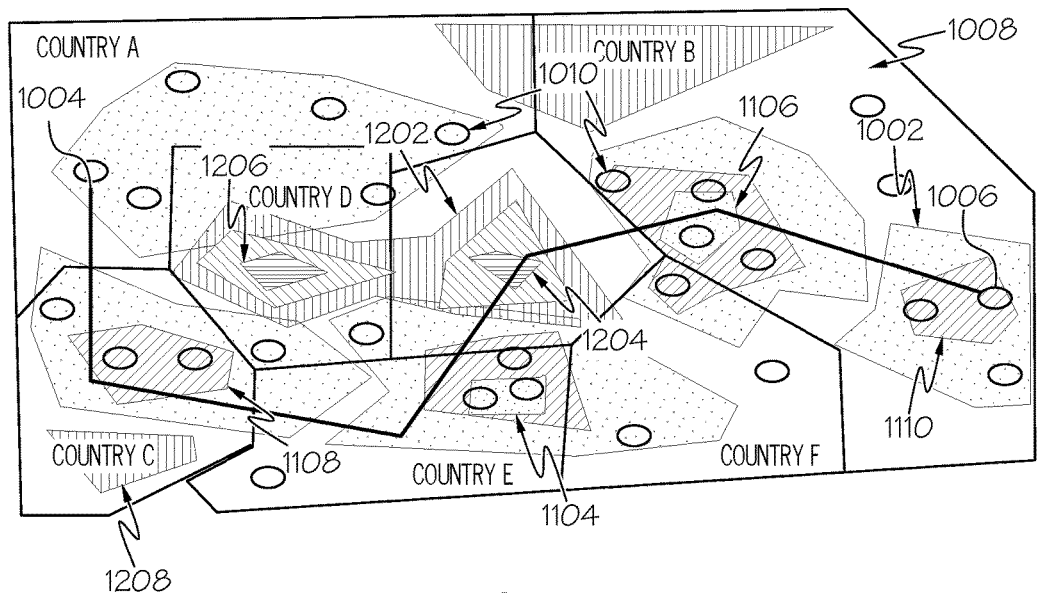

In exemplary embodiments, the flight plan segmentation process 900 continues by adjusting or otherwise scaling the distances of the density distribution functions based on meteorological and aircraft status information and then define flight path segment boundaries based on the combined and scaled density distribution functions (tasks 918, 920). In this regard, flight plan segmentation process 900 converts or otherwise transforms distances from a true geographic distance scale to an effective distance scale based on current or predicted status information. In other words, the effective distances correlate or otherwise correspond to flight times which are likely based on current or predicted meteorological conditions, aircraft speed, aircraft heading, aircraft altitude, and the like along the flight plan. FIG. 13 depicts a navigational map illustrating the density distributions 1102, 1202 for the geographic area 1008 overlaid on the flight plan 1002, with the distances within the flight plan 1002 and the flight plan geographic area 1008 being scaled from their true geographic distances to an adjusted distance representative of the likely flight times based on meteorological conditions within the flight plan geographic area 1008 and anticipated aircraft operation along the flight plan 1002.

In a similar manner as described above (e.g., tasks 702, 704, 706), the processing system 108 obtains current and/or forecasted meteorological information at various locations along the flight plan or otherwise within the flight plan geographic area along with current or planned aircraft status information along the flight plan. Using the wind speed and direction at a particular location at an expected flight level or altitude and the aircraft speed at that particular location and flight level, the processing system 108 scales distances between points or locations within the geographic area using the equation:

$$distance_{scaled} = \left(\frac{v_{cruise}}{v_{cruise} + v_{wind}}\right) \cdot distance,$$

where $v_{cruise}$ represents the expected aircraft velocity at or between a pair of points, wind represents the wind speed at or between a pair of points, and distance represents the true and unscaled geographic distance between the points. It should be noted that in practice where wind speed information may not be available for every location or point of interest, wind speeds from neighboring or adjacent locations may be interpolated, extrapolated, averaged or otherwise combined to arrive at an estimated wind speed at a particular point or between a particular pair of points. The scaling may be achieved by traversing the flight plan geographic area in a clockwise (or alternatively, counterclockwise) manner and shifting or otherwise adjusting distances between points in sets of four. For example, a set of four points (e.g., A, B, C, D) within the flight plan geographic area may be selected, and an average point-to-point wind component (or distance scaling factor) may be determined between each pair of points, with the geographic distance between each pair of points then being shifted relative to one another in a corresponding manner to reflect the likely flight time, resulting in a wind-shifted set of four points (e.g., A', B', C', D') corresponding to the original set. In this regard, a tail wind between two points reduces the distance between the two points, while a head wind between two points increases the distance between the two points.

In one or more embodiments, each of the aforementioned distribution functions (e.g., airport, morphology, topography or landing zone) are recalculated using wind scaled distances, for example, by scaling true distance coordinates (x, y) to wind-scaled coordinates (x', y') that reflect current or forecasted wind speeds and directions. In this regard, airport locations, topographic features, and the like may be transformed to wind-scaled distances relative to the planned flight path. In other embodiments, the values of the distribution functions are transformed or shifted in a similar manner as described above, for example, by selecting density values for a set of four points within the flight plan geographic area, determining an average point-to-point wind component (or distance scaling factor) between each pair of points, and determining an updated density value based on the original value at one point and a weighted sum of the other density values scaled according to meteorological conditions. For example, a wind-scaled density at a wind-shifted point A' may be calculated using the equation:

$$d_A' = d_A - d_B(\Delta B/R_{AB}) + d_C(\Delta C/R_{AC}) + d_D(\Delta D/R_{AD}),$$

where $d_A$ represents the original density value at point A, $d_B$ represents the original density value at point B, $\Delta B$ is the true distance between point B and wind-shifted point B', $R_{AB}$ is the true distance between points A and B, dc represents the original density value at point C, $\Delta C$ is the true distance between point C and wind-shifted point C', $R_{AC}$ is the true distance between points A and C, $d_D$ represents the original density value at point D, $\Delta D$ is the true distance between point D and wind-shifted point D', and $R_{AD}$ is the true distance between points A and D. In this regard, the resulting wind-scaled density represents a weighted average of density changes due to shifts in the remaining points of the quadruple set (e.g., B', C' and D'). Wind-scaled densities for those remaining points of the quadruple set may be calculated in a similar manner. Thus, a system of equations may be created for each set of points and used to adjust or otherwise scale the density distributions throughout the geographic area.

After the density distribution functions are scaled, the density distribution functions are combined to obtain an overall airport suitability density distribution function, which may then be utilized to assign flight path segment boundaries, as described in greater detail below in the context of FIGS. 14-15. In an exemplary embodiment, the airport suitability density distribution function is determined as a product of the wind-scaled airport density distribution function (e.g., from task 910), the wind-scaled morphology density distribution function (e.g., from task 912), and the wind-scaled topography (or landing zone preference) density distribution function (e.g., from task 916). For example, the airport suitability density distribution function maybe governed by the equation:

$$d_{suitability}(x',y') = d_{airport}(x',y')d_{morphology}(x',y')d_{topography}(x',y').$$

The flight plan segmentation criteria (e.g., from task 902) are utilized to delimit or otherwise define a range of wind-scaled coordinate pairs (x', y') along the flight plan for potential segment boundary locations, which are then identified based on an extrema of the airport suitability density distribution function within that range, as described below. For example, in exemplary embodiments, the location for a flight path segment boundary is identified as a location along the flight plan having a minimum value for the airport suitability density distribution function within a portion of the flight plan defined by the segmentation criteria. In this regard, the minimum value for the airport suitability density distribution function may occur at a location where the product of the preferentially weighted airport density and the topographic suitability density is at a minimum relative to the isolation of that particular location from potential airports. That is to say, the location where it is least advantageous or least suitable to divert from along that portion of the flight plan is chosen as a flight path segment boundary. As a result, the flight path segments will not be centered on or aligned with less advantageous or less suitable locations for diverting, and the recommended diversion airports for those flight path segments will similarly not be biased toward accommodating diversions from such less advantageous locations.

Once the segment boundary locations are identified, the locations are transformed from scaled coordinates (x',y') to true unscaled coordinates (x, y), for example, by mapping the scaled location along the flight path back to the true coordinate location. For example, in one embodiment, three points from the wind-scaled grid that are closest to the segment boundary location are identified and corresponding true coordinate locations for those points are identified and interpolated to obtain a segment boundary location in the unscaled coordinate system having true geographic distances. In one embodiment, versions of the density distributions are determined and maintained for each coordinate system (e.g., true geographic distances and wind-scaled, travel time-based distances) and utilized to translate or otherwise transform locations from one coordinate system to the other and vice versa.

Referring again to FIG. 9, after the flight plan is segmented, in exemplary embodiments, the segmentation process 900 generates or otherwise provides graphical indicia of the flight path segments identified based on the scaled density distribution functions and the segmentation criteria (task 922). Additionally, in one or more exemplary embodiments, the diversion selection process 200 of FIG. 2 is performed with respect to those flight path segments to generate or otherwise provide graphical indicia of the recommended diversion airports with respect to those flight path segments (task 924). Thus, not only does the segmentation process 900 eliminate the need for a pilot or other user to mentally or manually determine how to subdivide a flight plan by automatically segmenting the flight plan, but the segmentation process 900 can also eliminate the need for the pilot or other user to subsequently designate alternate airports along the flight plan in conjunction with the diversion selection process 200.

FIG. 14 depicts a boundary identification process 1400 suitable for implementation in conjunction with the flight plan segmentation process 900 to identify locations for flight path segment boundaries (e.g., task 920) according to preference information and airport, topographic, and geographic distributions within a geographic area corresponding to a flight plan. The various tasks performed in connection with the illustrated process 1400 may be implemented using hardware, firmware, software executed by processing circuitry, or any combination thereof. For illustrative purposes, the following description may refer to elements mentioned above in connection with FIG. 1. In practice, portions of the boundary identification process 1400 may be performed by different elements of the system 100, such as, the processing system 108, the display system 110, the communications system 112, the navigation system 114, the FMS 116, the onboard avionics systems 118, the onboard detection systems 120, the data storage element 124 and/or the user input device(s) 106. It should be appreciated that the boundary identification process 1400 may include any number of additional or alternative tasks, the tasks need not be performed in the illustrated order and/or the tasks may be performed concurrently, and/or the boundary identification process 1400 may be incorporated into a more comprehensive procedure or process having additional functionality not described in detail herein. Moreover, one or more of the tasks shown and described in the context of FIG. 14 could be omitted from a practical embodiment of the boundary identification process 1400 as long as the intended overall functionality remains intact.

In exemplary embodiments, the boundary identification process 1400 identifies an initial location for a flight path segment and then utilizes the flight plan segmentation criteria to determine a subsequent portion of the flight plan suitable for placement of the flight path segment exit boundary (tasks 1402, 1404). The initial iteration of the boundary identification process 1400 may select or otherwise identify the departure (or starting) location of the flight plan as the initial flight path segment boundary, while subsequent iterations of the boundary identification process 1400 may select or otherwise identify the previously identified flight path segment exit boundary for the preceding flight path segment as the initial flight path segment boundary location for the current flight path segment being defined. The flight path segmentation criteria generally define the portion of the flight plan (or range) where the current flight path segment being defined should terminate to facilitate achieving the desired number of flight path segments for the flight plan, the desired minimum or maximum flight time duration or distance for the flight path segments, or some combination thereof. In some embodiments, the desired minimum or maximum flight time duration or distance for the flight path segments may be calculated for a particular flight plan based on the desired number of flight path segments or a range of minimum and maximum number of flight path segments for the flight plan. For example, a minimum flight time duration may be determined by dividing the estimated duration of the flight plan by the maximum number of flight path segments, and a maximum flight time duration may be determined by dividing the estimated duration of the flight plan by the minimum number of flight path segments. In one or more exemplary embodiments, the processing system 108 utilizes the scaled flight plan to identify a portion of the flight plan defined by the minimum and maximum flight time durations for flight path segments from the initial flight path segment boundary.

After identifying the portion of the flight plan where a segment boundary should be placed according to the flight plan segmentation criteria, the process 1400 continues by identifying a location within that portion of the flight plan corresponding to an extrema of the combined scaled density distribution function and sets that location as the exit boundary for the flight path segment being defined (tasks 1406, 1408). In exemplary embodiments, the processing system 108 identifies a location along the flight plan within the potential boundary portion defined by the flight plan segmentation criteria that has a relatively low density of airports and a relatively high degree of isolation from potential diversion airports, that is, the location within the potential boundary portion where the density product ($d_{airport}(x', y')d_{morphology}(x', y')$) is at a minimum. Additionally, in one or more embodiments, the location also has a relatively low suitability for use as a landing zone based on topography or geography.

In one embodiment, the location identified as the flight path segment exit boundary has the minimum airport density within the potential boundary portion of the flight plan. In another embodiment, the location identified as the flight path segment exit boundary has the maximum degree of isolation relative to the potential diversion airports within the potential boundary portion of the flight plan. In yet other embodiments, the location identified as the flight path segment exit boundary has the minimum landing zone suitability within the potential boundary portion of the flight plan. That said, in some embodiments, the location identified as the flight path segment exit boundary may have a minimum combined diversion suitability calculated as a combination of a relatively low airport density, a relatively low landing zone suitability, and a relatively high degree of isolation from potential diversion airports. For example, the flight path segment exit boundary may be set at the coordinate location within the potential boundary portion where $d_{suitability}(x', y')$ is at its minimum value within the potential boundary portion.

Once the extrema of the combined scaled density distribution function is identified, the processing system 108 designates the corresponding location along the flight plan as an exit boundary of the current segment being defined and utilizes the location as the initial location for entrance boundary of the next flight path segment being defined (e.g., task 1402) until the end of the flight plan is reached. In this regard, the loop defined by tasks 1402, 1404, 1406, and 1408 may repeat until the flight plan is divided into an appropriate number of flight path segments that is in accordance with the flight plan segmentation criteria.

Figure 15:
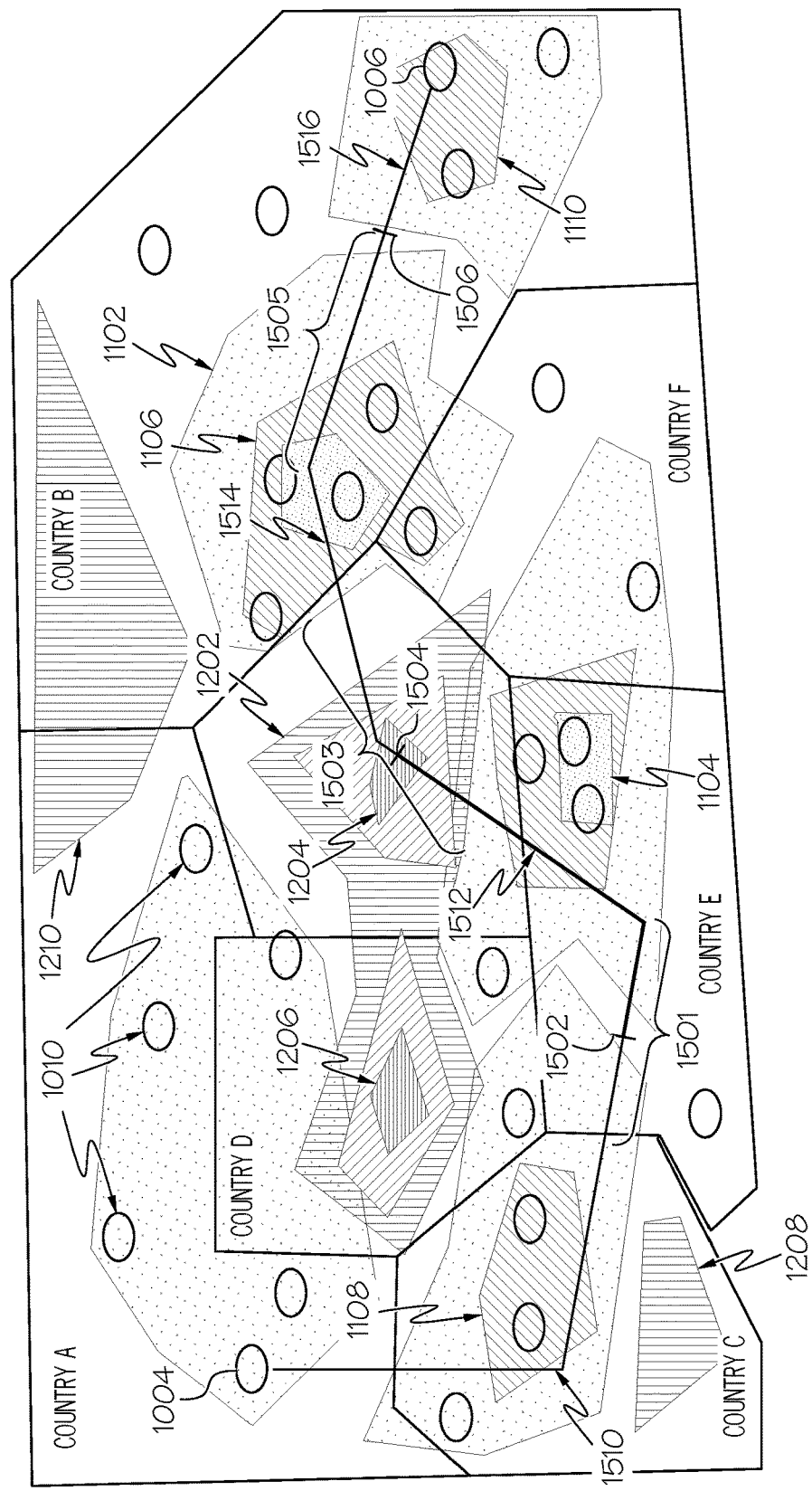
FIG. 15 depicts a navigational map illustrating aspects of the boundary identification process of FIG. 14 in conjunction with the sequence of FIGS. 10-13 in one exemplary embodiment.

FIG. 15 depicts an exemplary navigational map illustrating an embodiment of the process 1400 by the processing system 108 using the geographic area of FIGS. 10-13. The processing system 108 identifies the departure location 1004 as the initial location for the first flight path segment and identifies a portion 1501 of the flight plan 1002 suitable for the exit boundary of the first flight path segment based on the flight path segmentation criteria. Thereafter, the processing system 108 identifies a location 1502 along the flight plan 1002 within the potential boundary portion 1501 having a minimum airport density as the exit boundary location for the first flight path segment 1510. Thereafter, the processing system 108 identifies the first flight path segment exit boundary location 1502 as the initial location for the second flight path segment and identifies a subsequent portion 1503 of the flight plan 1002 suitable for the exit boundary of the first flight path segment based on the flight path segmentation criteria. Thereafter, the processing system 108 identifies a location 1504 along the flight plan 1002 within the potential boundary portion 1503 having a maximum morphology density and minimum airport density as the exit boundary location for the second flight path segment 1512. The processing system 108 continues by using the second flight path segment exit boundary location 1504 as the initial location for the third flight path segment and identifies a subsequent portion 1505 of the flight plan 1002 suitable for the exit boundary of the third flight path segment based on the flight path segmentation criteria. The processing system 108 identifies the location 1506 within the potential boundary portion 1505 having the minimum airport density within that flight plan portion 1505 as the exit boundary location for the third flight path segment 1514 and the entrance boundary location for the fourth flight path segment 1516 terminating at the destination location 1006.

After segmenting the flight plan 1002 into flight path segments 1510, 1512, 1514, 1516, the processing system 108 generates or otherwise provides graphical indicia of the segments 1510, 1512, 1514, 1516 and/or the segment boundary locations 1502, 1504, 1506 on the display device 104 on or overlying a navigational map of the flight plan geographic area having true geographic distances. Thereafter, the processing system 108 may perform the diversion selection process 200 with respect to the flight path segments 1510, 1512, 1514, 1516 to identify recommended diversion airports with respect to the flight path segments 1510, 1512, 1514, 1516 and provide corresponding graphical indicia of the recommended diversion airports as described above.

FIG. 16 depicts an exemplary navigational map display 1600 that may be displayed, rendered, or otherwise presented by the display system 110 and/or the processing system 108 on the display device 104 in conjunction with the segmentation process 900 of FIG. 9. The illustrated navigational map 1600 includes a graphical representation 1602 of a flight plan from an initial departure location 1601 to a destination location 1603 overlaid or rendered on top of a background 1604. The illustrated map 1600 depicts a scenario where the flight plan 1602 is automatically segmented into to three segments 1610, 1612, 1614. The map 1600 includes graphical indicia of segment boundaries 1611, 1613 to indicate, to a pilot, where the respective segments 1610, 1612, 1614 start or end. Additionally, adjacent segments 1610, 1612, 1614 may be rendered using visually distinguishable characteristics to allow the pilot to more easily delineate the segments 1610, 1612, 1614. As illustrated, segment boundary indicia 1613 is positioned overlying a body of water at a location having low airport density and low topographic suitability and relatively high morphology distance for reaching potential diversion airports, resulting in an extrema of the of the suitability distribution function along the flight plan 1602 at the location of the boundary indicia 1613. Similarly, indicia 1611 is positioned at an extrema of the of the suitability distribution function along the flight plan 1602 within a range relative to the initial location 1601 that is defined by the segmentation criteria. In one or more embodiments, the segment boundary indicia 1611, 1613 may be manually adjusted by sliding them along the flight plan 1602 to alter the length of one or more segments 1610, 1612, 1614. Although not depicted in FIG. 16, in practice, the background 1604 may also include graphical representations of the potential diversion airports in the displayed geographic area. That said, in one or more exemplary embodiments, the diversion selection process 200 is subsequently initiated or performed to identify and display those recommended diversion airports 1620, 1622, 1624 associated with the segments 1610, 1612, 1614 in a similar manner as described above. In some embodiments, only the recommended diversion airports 1620, 1622, 1624 associated with the segments 1610, 1612, 1614 are displayed or indicated, with other potential diversion airports being deemphasized, removed, or otherwise obfuscated from view and a common visually distinguishable characteristic (e.g., a common fill pattern) being used to visually indicate the association between a respective segment 1610, 1612, 1614 and a respective diversion airport 1620, 1622, 1624.

FIG. 17 depicts an exemplary embodiment of an electronic flight bag (EFB) system 1700 suitable for implementing the subject matter described herein. The EFB system includes an electronic device 1702 (alternatively referred to as the EFB) that is communicatively coupled to a host device 1704 that is communicatively coupled to the avionics systems 1706 onboard an aircraft (e.g., avionics systems 112, 114, 116, 118, 120). The host device 1704 generally represents a computer system configured support the processes described herein and provide corresponding indications of the flight path segments and the recommended diversion airports associated therewith on the electronic device 1702. For purposes of explanation, but without limitation, the host device 1704 is referred to herein as a server unit (or server). In this regard, the host server 1704 includes at least a processing system (e.g., processing system 108) and/or other hardware computing resources along with one or more data storage elements (or memory) capable of storing instructions, that, when read and executed by the processing system, cause the host server 1704 to generate or otherwise support the processes described above. The host server 1704 may also be coupled to a communications network 1708, which may be utilized to receive data and/or information (e.g., meteorological information, or the like) in conjunction with the processes described above and/or to support communications with the electronic device 1702.

In exemplary embodiments, the electronic device 1702 is realized as a laptop or notebook computer, a tablet computer, or another suitable computing device configured to provide EFB-functionality, and accordingly, the electronic device 1702 is alternatively referred to herein as an EFB. The EFB 1702 includes at least display device (e.g., display device 104) and a processing system (e.g., processing system 108 and/or display system 110), a data storage element (or memory) configured to support generating or otherwise providing graphical indicia as described above.

In one or more embodiments, a pilot of the aircraft utilizes the EFB 1702 to initiate one or more of the processes described above and inputs or otherwise provides the flight path segmentation criteria or preference information the pilot would like to utilize. Thereafter, the EFB 1702 may transmit or otherwise provide indication of the desire to perform the processes 200, 900, 1400 to the server 1704 along with the flight path segmentation criteria or preference information. The server 1704 accesses the avionics systems 1706 and/or the communications network 1708 to receive or otherwise obtain the meteorological information for the region of interest encompassing the flight plan along with the aircraft status information for the flight plan. Thereafter, the server 1704 identifies optimal flight path segments and recommended diversion airports associated therewith provides indication of the flight path segments and the corresponding alternate airports to the EFB 1702, which, in turn, generates or otherwise provides a graphical indication of the flight plan, the segmentation thereof, and the associated alternate airports for the flight path segments on the display of the EFB 1702. Thus, the pilot may utilize the EFB 1702 to assess or otherwise analyze the potential diversion airports with respect to the flight plan and operate the aircraft accordingly.

For the sake of brevity, conventional techniques related to graphics and image processing, avionics systems, aircraft or airline operations, diversions, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

The subject matter may be described herein in terms of functional and/or logical block components, and with reference to symbolic representations of operations, processing tasks, and functions that may be performed by various computing components or devices. It should be appreciated that the various block components shown in the figures may be realized by any number of hardware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices. Furthermore, embodiments of the subject matter described herein can be stored on, encoded on, or otherwise embodied by any suitable non-transitory computer-readable medium as computer-executable instructions or data stored thereon that, when executed (e.g., by a processing system), facilitate the processes described above.

The foregoing description refers to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although the drawings may depict one exemplary arrangement of elements directly connected to one another, additional intervening elements, devices, features, or components may be present in an embodiment of the depicted subject matter. In addition, certain terminology may also be used herein for the purpose of reference only, and thus are not intended to be limiting.

The foregoing detailed description is merely exemplary in nature and is not intended to limit the subject matter of the application and uses thereof. Furthermore, there is no intention to be bound by any theory presented in the preceding background, brief summary, or the detailed description.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the subject matter in any way. Rather, the foregoing detailed description will provide those skilled in the art with a convenient road map for implementing an exemplary embodiment of the subject matter. It should be understood that various changes may be made in the function and arrangement of elements described in an exemplary embodiment without departing from the scope of the subject matter as set forth in the appended claims. Accordingly, details of the exemplary embodiments or other limitations described above should not be read into the claims absent a clear intention to the contrary.

What is claimed is:

1. A method of presenting diversion airports for an aircraft, the method comprising:
    identifying a segmentation criterion for dividing a flight plan into a number of segments;
    determining, by a processing system, an airport density distribution within a geographic area encompassing a flight path defined by the flight plan;
    obtaining, by the processing system, meteorological conditions within the geographic area from a weather monitoring system;
    transforming, by the processing system, the airport density distribution from a true distance scale to an effective distance scale based at least in part on the meteorological conditions;
    identifying, by the processing system based at least in part on the airport density distribution, a location for a segment boundary along the flight path within a portion of the flight path defined by the segmentation criterion on the effective distance scale;
    providing, by the processing system on a display device associated with the aircraft, a graphical indication of a flight path segment defined by the segment boundary;
    identifying, by the processing system, a recommended diversion airport with respect to the flight path segment defined by the segment boundary; and
    providing, by the processing system on the display device, a graphical indication of the recommended diversion airport associated with the flight path segment.

2. The method of claim 1, wherein:
    determining the airport density distribution comprises determining the airport density distribution based on a plurality of airports within the geographic area encompassing the flight path; and
    identifying the location comprises identifying the location having a minimum value for the airport density distribution along the flight path within the portion of the flight path.

3. The method of claim 2, further comprising obtaining airport preference information from a user, wherein determining the airport density distribution comprises determining a spread function within the geographic area based on the airport preference information.

4. The method of claim 1, further comprising determining an airport morphology distribution based on a plurality of airports within the geographic area encompassing the flight path; and
    identifying the location comprises identifying the location based on a product of the airport density distribution and the airport morphology distribution along the flight path within the portion of the flight path.

5. The method of claim 1, wherein:
    identifying the location comprises identifying the location based at least in part on a minimum of the airport density distribution along the flight path within the portion of the flight path.

6. The method of claim 5, further comprising obtaining landing zone preference information from a user, wherein:
    determining the one or more diversion suitability distributions comprises determining a landing zone preference distribution within the geographic area based on the landing zone preference information; and
    identifying the location comprises identifying the minimum of a product of the landing zone preference distribution and the airport density distribution along the flight path within the portion of the flight path.

7. The method of claim 1, further comprising receiving, by a processing system via a user input device onboard the aircraft, the segmentation criterion, wherein the graphical indicia of the flight path segment and the diversion airport are provided by the processing system on the display device onboard the aircraft.

8. The method of claim 1, further comprising:
    identifying a subset of airports satisfying one or more filtering criteria with respect to the flight path segment; and
    identifying, from among the subset, the recommended diversion airport based on a ranking of respective airports of the subset of airports according to a respective viability associated with each respective airport of the subset of airports.

9. The method of claim 8, further comprising:
    obtaining anticipated status information associated with the aircraft for one or more locations along the flight path segment; and
    determining the respective viability of each respective airport of the subset based at least in part on the anticipated status information associated with the aircraft.

10. A computer-readable medium having computer-executable instructions stored thereon that, when executed by a processing system onboard the aircraft, cause the processing system to perform the method of claim 1.

11. A system comprising:
    a display device onboard a vehicle;
    a user input device onboard the vehicle to obtain a segmentation criterion for dividing a travel plan into a number of segments;
    a data storage element maintaining diversion preference information; and
    a processing system coupled to the user input device, the data storage element, and the display device to:
        determine one or more density distributions within a geographic area encompassing a path defined by the travel plan based at least in part on the diversion preference information;
        transform the one or more density distributions from a true distance scale to an effective distance scale based at least in part on meteorological information pertaining to the travel plan;
        identify a location for a segment boundary along the travel plan based on an extremum of the one or more density distributions within a portion of the travel plan defined by the segmentation criterion on the effective distance scale;
        provide a graphical indication of a segment defined by the segment boundary on the display device;
        identify a recommended diversion destination with respect to the segment defined by the segment boundary; and
        provide a graphical indication of the recommended diversion destination associated with the segment defined by the segment boundary on the display device.

12. The system of claim 11, further comprising a communications system onboard the vehicle to obtain the meteorological information, wherein the processing system is coupled to the communications system.

13. The system of claim 11, wherein the processing system is configured to determine viability associated with respective destinations of a plurality of destinations with respect to the segment and identify the recommended diversion destination from among the plurality as recommended based on a ranking of the respective destinations according to the viability.

14. The system of claim 13, further comprising one or more systems onboard the vehicle to obtain status information associated with the vehicle, wherein the processing system determines the viability using the status information associated with the vehicle.

15. The system of claim 11, the vehicle comprising an aircraft, the travel plan comprising a flight plan, and the diversion preference information corresponding to one or more of a plurality of airports within a geographic area encompassing a flight path defined by the flight plan, wherein the one or more density distributions comprise an airport density distribution based on the plurality of airports and the diversion preference information.

16. The system of claim 11, the vehicle comprising an aircraft, the travel plan comprising a flight plan, and the diversion preference information corresponding to one or more topographic or geographic features within a geographic area encompassing a flight path defined by the flight plan, wherein the one or more density distributions comprise a landing zone suitability distribution based on the diversion preference information and the one or more topographic or geographic features within the geographic area.

17. A method of presenting potential diversion airports for an aircraft, the method comprising:
    identifying, by a processing system onboard the aircraft, a segmentation criterion for dividing a flight plan into a number of segments;
    obtaining, by the processing system, diversion preference information;
    determining, by the processing system, one or more density distributions within a geographic area encompassing a flight path defined by the flight plan based at least in part on the diversion preference information;
    obtaining, by the processing system, meteorological conditions pertaining to the flight plan from a weather monitoring system;
    transforming, by the processing system, the one or more density distributions from a true distance scale to an effective distance scale based at least in part on the meteorological conditions, resulting in one or more scaled density distributions;
    identifying, by the processing system, a location for a segment boundary along the flight path based on an extremum of the one or more scaled density distributions within a portion of the flight path defined by the segmentation criterion on the effective distance scale;
    providing, by the processing system on a display device onboard the aircraft, a graphical indication of a flight path segment defined by the segment boundary;
    identifying, by the processing system, a recommended diversion airport with respect to the flight path segment defined by the segment boundary; and
    providing, by the processing system on the display device, a graphical indication of the recommended diversion airport associated with the flight path segment.

18. The method of claim 17, wherein:
    determining the one or more density distributions comprises determining an airport density distribution based on a plurality of airports within the geographic area encompassing the flight path and the diversion preference information associated with respective airports of the plurality of airports; and
    identifying the location comprises identifying the location based at least in part on a minimum of the airport density distribution along the flight path within the portion of the flight path.

19. The method of claim 18, further comprising determining an airport morphology distribution based on the plurality of airports, wherein identifying the location comprises identifying the minimum of a product of the airport density distribution and the airport morphology distribution.

20. The method of claim 17, wherein:
    determining the one or more density distributions comprises determining a landing zone suitability distribution based on one or more topographic or geographic features within the geographic area encompassing the flight path and the diversion preference information associated with respective topographic or geographic features of the one or more topographic or geographic features; and
    identifying the location comprises identifying a minimum of the landing zone suitability distribution along the flight path within the portion of the flight path.

* * * * *